United States Patent
Johnson et al.

(10) Patent No.: US 9,036,290 B2
(45) Date of Patent: *May 19, 2015

(54) HEAD TRANSDUCER WITH MULTIPLE RESISTANCE TEMPERATURE SENSORS FOR HEAD-MEDIUM SPACING AND CONTACT DETECTION

(71) Applicant: Seagate Technology LLC, Cupertino, CA (US)

(72) Inventors: Michael Thomas Johnson, Minneapolis, MN (US); Dongming Liu, Eden Prairie, MN (US); Huazhou Lou, Eden Prairie, MN (US); Declan Macken, Prior Lake, MN (US); Timothy William Stoebe, Minnetonka, MN (US); James Gary Wessel, Savage, MN (US); Xuan Zheng, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,678

(22) Filed: Aug. 12, 2014

(65) Prior Publication Data
US 2014/0347760 A1    Nov. 27, 2014

Related U.S. Application Data

(63) Continuation of application No. 13/299,139, filed on Nov. 17, 2011, now Pat. No. 8,810,952.

(60) Provisional application No. 61/414,733, filed on Nov. 17, 2010, provisional application No. 61/414,734, filed on Nov. 17, 2010.

(51) Int. Cl.
*G11B 21/02* (2006.01)
*G11B 20/10* (2006.01)
*G11B 5/60* (2006.01)

(52) U.S. Cl.
CPC .............. *G11B 20/10* (2013.01); *G11B 5/607* (2013.01); *G11B 5/6076* (2013.01); *G11B 5/6011* (2013.01)

(58) Field of Classification Search
USPC ........................................... 360/75
See application file for complete search history.

(56) References Cited

U.S. PATENT DOCUMENTS

| 5,025,341 A | 6/1991 | Bousquet et al. |
| 5,080,495 A | 1/1992 | Hashimoto et al. |

(Continued)

FOREIGN PATENT DOCUMENTS

| EP | 0752700 | 1/1997 |
| EP | 1850333 | 10/2007 |

(Continued)

OTHER PUBLICATIONS

File History for U.S. Appl. No. 13/299,082 as retrieved from the U.S. Patent and Trademark Office on May 27, 2014, 159 pages.

(Continued)

*Primary Examiner* — Tan X Dinh
(74) *Attorney, Agent, or Firm* — Hollingsworth Davis, LLC

(57) ABSTRACT

A head transducer, configured to interact with a magnetic recording medium, includes a first sensor having a temperature coefficient of resistance (TCR) and configured to produce a first sensor signal, and a second sensor having a TCR and configured to produce a second sensor signal. One of the first and second sensors is situated at or near a close point of the head transducer in relation to the magnetic recording medium, and the other of the first and second sensors spaced away from the close point. Circuitry is configured to combine the first and second sensor signals and produce a combined sensor signal indicative of one or both of a change in head-medium spacing and head-medium contact. Each of the sensors may have a TCR with the same sign (positive or negative) or each sensor may have a TCR with a different sign.

20 Claims, 22 Drawing Sheets

(56) References Cited

U.S. PATENT DOCUMENTS

| | | |
|---|---|---|
| 5,561,896 A | 10/1996 | Voegeli et al. |
| 5,576,745 A | 11/1996 | Matsubara |
| 5,646,805 A | 7/1997 | Shen et al. |
| 5,689,292 A | 11/1997 | Suzuki et al. |
| 5,691,867 A | 11/1997 | Onuma et al. |
| 5,792,569 A | 8/1998 | Sun et al. |
| 5,901,001 A | 5/1999 | Meyer |
| 5,991,113 A | 11/1999 | Meyer et al. |
| 6,019,503 A | 2/2000 | Abraham et al. |
| 6,024,430 A | 2/2000 | Koitabashi et al. |
| 6,052,243 A | 4/2000 | Shimada |
| 6,052,249 A | 4/2000 | Abraham |
| 6,071,007 A | 6/2000 | Schaenzer |
| 6,125,008 A | 9/2000 | Berg |
| 6,178,157 B1 | 1/2001 | Berg |
| 6,181,520 B1 | 1/2001 | Fukuda |
| 6,262,572 B1 | 7/2001 | Franco et al. |
| 6,262,858 B1 | 7/2001 | Sugiyama et al. |
| 6,265,869 B1 | 7/2001 | Takahashi |
| 6,311,551 B1 | 11/2001 | Boutaghou |
| 6,338,899 B1 | 1/2002 | Fukuzawa et al. |
| 6,359,746 B1 | 3/2002 | Kakekado |
| 6,366,416 B1 | 4/2002 | Meyer |
| 6,377,422 B1 | 4/2002 | Boutaghou et al. |
| 6,501,606 B2 | 12/2002 | Boutaghou |
| 6,552,880 B1 | 4/2003 | Dunbar |
| 6,577,466 B2 | 6/2003 | Meyer |
| 6,594,104 B2 | 7/2003 | Tokuyama et al. |
| 6,600,622 B1 | 7/2003 | Smith |
| 6,603,619 B1 | 8/2003 | Kojima et al. |
| 6,662,623 B2 | 12/2003 | Baumgartner |
| 6,666,076 B2 | 12/2003 | Lin |
| 6,671,133 B1 | 12/2003 | Sasaki |
| 6,692,848 B2 | 2/2004 | Ohtani |
| 6,697,223 B2 | 2/2004 | Lewis |
| 6,700,724 B2 | 3/2004 | Riddering |
| 6,771,453 B2 | 8/2004 | Baumgartner |
| 6,776,176 B1 | 8/2004 | Kino |
| 6,785,081 B2 | 8/2004 | Chapin |
| 6,788,500 B2 | 9/2004 | Baril et al. |
| 6,899,456 B2 | 5/2005 | Sundaram et al. |
| 6,958,871 B2 | 10/2005 | Hirano |
| 6,967,805 B1 | 11/2005 | Hanchi et al. |
| 7,006,336 B2 | 2/2006 | Coffey et al. |
| 7,042,674 B1 | 5/2006 | Baril et al. |
| 7,064,659 B2 | 6/2006 | Baumgartner |
| 7,068,457 B2 | 6/2006 | Riddering |
| 7,092,195 B1 | 8/2006 | Liu et al. |
| 7,099,096 B2 | 8/2006 | Ueyanagi |
| 7,130,141 B2 | 10/2006 | Chey et al. |
| 7,180,692 B1 | 2/2007 | Che |
| 7,190,543 B2 * | 3/2007 | Suk .................. 360/69 |
| 7,194,802 B2 | 3/2007 | Fayeulle |
| 7,199,960 B1 | 4/2007 | Schreck |
| 7,233,451 B2 | 6/2007 | Baumgart |
| 7,262,936 B2 | 8/2007 | Hamann et al. |
| 7,265,922 B2 | 9/2007 | Biskeborn et al. |
| 7,278,902 B1 | 10/2007 | Kurita |
| 7,310,197 B2 | 12/2007 | Baumgart |
| 7,310,198 B2 | 12/2007 | Baumgart |
| 7,312,941 B2 | 12/2007 | Hirano |
| 7,362,535 B2 | 4/2008 | Kumano |
| 7,365,931 B2 | 4/2008 | Ikai |
| 7,371,708 B2 | 5/2008 | Arai et al. |
| 7,372,665 B1 | 5/2008 | Stoev et al. |
| 7,411,752 B2 | 8/2008 | Angelo |
| 7,417,820 B2 | 8/2008 | Otsuki et al. |
| 7,450,333 B2 | 11/2008 | Hirano |
| 7,477,470 B2 | 1/2009 | Leis et al. |
| 7,508,612 B2 | 3/2009 | Biskeborn et al. |
| 7,518,818 B2 | 4/2009 | Yamazaki et al. |
| 7,561,368 B2 | 7/2009 | Kim et al. |
| 7,564,649 B2 | 7/2009 | Hanchi et al. |
| 7,593,187 B2 | 9/2009 | Aoki |
| 7,595,960 B2 | 9/2009 | Shimizu et al. |
| 7,616,398 B2 | 11/2009 | Gong |
| 7,623,322 B2 | 11/2009 | Umehara et al. |
| 7,626,144 B2 | 12/2009 | Merzliakov |
| 7,649,714 B2 | 1/2010 | Kato et al. |
| 7,692,888 B2 | 4/2010 | Duan |
| 7,692,898 B2 | 4/2010 | Hattori |
| 7,706,109 B2 | 4/2010 | Nichols et al. |
| 7,724,480 B1 | 5/2010 | Guo |
| 7,729,079 B1 | 6/2010 | Huber |
| 7,729,087 B1 | 6/2010 | Stoev et al. |
| 7,742,255 B2 | 6/2010 | Daugela |
| 7,760,457 B1 | 7/2010 | Gunderson |
| 7,773,346 B1 | 8/2010 | Guo |
| 7,787,201 B2 | 8/2010 | Alex |
| 7,787,207 B2 | 8/2010 | Takahashi |
| 7,796,356 B1 | 9/2010 | Fowler et al. |
| 7,800,858 B1 | 9/2010 | Bajikar et al. |
| 7,804,657 B1 | 9/2010 | Hogg et al. |
| 7,864,474 B2 | 1/2011 | Satoh et al. |
| 7,872,824 B1 | 1/2011 | Macchioni et al. |
| 7,903,365 B2 | 3/2011 | Watanabe |
| 7,929,249 B2 | 4/2011 | Seigler |
| 7,929,256 B2 | 4/2011 | Yamashita et al. |
| 8,049,984 B2 | 11/2011 | Contreras |
| 8,098,450 B2 | 1/2012 | Baumgart et al. |
| 8,144,412 B2 | 3/2012 | Kiyono |
| 8,149,541 B2 | 4/2012 | Baumgart |
| 8,199,431 B2 | 6/2012 | Kanaya et al. |
| 8,248,737 B2 | 8/2012 | Chen |
| 8,279,557 B2 | 10/2012 | Kautzky |
| 8,297,113 B2 | 10/2012 | Liners et al. |
| 8,310,779 B2 | 11/2012 | Hanchi |
| 8,335,053 B2 | 12/2012 | Chen |
| 8,523,312 B2 | 9/2013 | Zheng et al. |
| 8,737,009 B2 | 5/2014 | Kunkel et al. |
| 2002/0039264 A1 | 4/2002 | Ohsawa et al. |
| 2002/0056313 A1 | 5/2002 | Wakefield et al. |
| 2002/0071196 A1 | 6/2002 | Chapin |
| 2002/0071215 A1 | 6/2002 | Lewis |
| 2002/0093753 A1 | 7/2002 | Atsumi |
| 2002/0118485 A1 | 8/2002 | Tokuyama et al. |
| 2003/0002183 A1 | 1/2003 | Fioravanti |
| 2003/0043491 A1 | 3/2003 | Riddering |
| 2003/0043497 A1 | 3/2003 | Riddering |
| 2003/0051529 A1 | 3/2003 | Baumgartner |
| 2003/0058559 A1 | 3/2003 | Brand |
| 2003/0086197 A1 | 5/2003 | Baumgartner |
| 2003/0206361 A1 | 11/2003 | Baril et al. |
| 2004/0027728 A1 | 2/2004 | Coffey et al. |
| 2004/0085670 A1 | 5/2004 | Li et al. |
| 2004/0190175 A1 | 9/2004 | Chey et al. |
| 2004/0240109 A1 | 12/2004 | Hamann et al. |
| 2005/0057833 A1 | 3/2005 | Hirano |
| 2005/0057834 A1 | 3/2005 | Hirano |
| 2005/0174665 A1 | 8/2005 | Zhang |
| 2005/0176582 A1 | 8/2005 | Arai et al. |
| 2005/0190496 A1 | 9/2005 | Hamann et al. |
| 2006/0034013 A1 | 2/2006 | Kato et al. |
| 2006/0119974 A1 | 6/2006 | Yamazaki et al. |
| 2006/0285243 A1 | 12/2006 | Baumgart |
| 2007/0019325 A1 | 1/2007 | Shimizu et al. |
| 2007/0091512 A1 | 4/2007 | Nichols et al. |
| 2007/0097536 A1 | 5/2007 | Biskeborn et al. |
| 2007/0133118 A1 | 6/2007 | Kajitani |
| 2007/0201154 A1 | 8/2007 | Ozeki |
| 2007/0206654 A1 | 9/2007 | Merzliakov |
| 2007/0242382 A1 | 10/2007 | Biskeborn et al. |
| 2008/0080086 A1 | 4/2008 | Che |
| 2008/0100965 A1 * | 5/2008 | Oki ............................ 360/234.3 |
| 2008/0130152 A1 | 6/2008 | Kameyama |
| 2008/0137225 A1 | 6/2008 | Duan |
| 2008/0145709 A1 | 6/2008 | Yamashita et al. |
| 2008/0218909 A1 | 9/2008 | Kurihara et al. |
| 2008/0225426 A1 | 9/2008 | Roy et al. |
| 2008/0225427 A1 | 9/2008 | Liu |
| 2008/0239581 A1 | 10/2008 | Ikai et al. |
| 2008/0247078 A1 | 10/2008 | Yao |
| 2008/0247079 A1 | 10/2008 | Satoh et al. |
| 2008/0247080 A1 | 10/2008 | Kim et al. |

(56) References Cited

U.S. PATENT DOCUMENTS

| | | | |
|---|---|---|---|
| 2008/0259480 A1 | 10/2008 | Pham | |
| 2008/0291579 A1 | 11/2008 | Uesugi et al. | |
| 2009/0021867 A1 | 1/2009 | Kondo | |
| 2009/0122435 A1 | 5/2009 | Takahashi | |
| 2009/0153995 A1 | 6/2009 | Jang | |
| 2009/0190260 A1 | 7/2009 | Kobatake | |
| 2009/0262460 A1* | 10/2009 | Hanchi et al. | 360/235.4 |
| 2010/0007976 A1 | 1/2010 | Baumgart | |
| 2010/0020439 A1 | 1/2010 | Watanabe | |
| 2010/0053815 A1 | 3/2010 | Komoriya | |
| 2010/0097721 A1 | 4/2010 | Baumgart | |
| 2010/0142096 A1 | 6/2010 | Contreras | |
| 2010/0149696 A1 | 6/2010 | Chen | |
| 2010/0157477 A1 | 6/2010 | Morinaga | |
| 2010/0182723 A1 | 7/2010 | Yanagisawa | |
| 2010/0232067 A1 | 9/2010 | Liners et al. | |
| 2011/0032642 A1 | 2/2011 | Kautzky | |
| 2011/0096440 A1 | 4/2011 | Greminger | |
| 2011/0122533 A1 | 5/2011 | Kiyono | |
| 2011/0157740 A1 | 6/2011 | Baumgart et al. | |
| 2011/0235207 A1 | 9/2011 | Yang | |
| 2011/0235208 A1* | 9/2011 | Yang | 360/75 |
| 2011/0249363 A1 | 10/2011 | Kanaya et al. | |
| 2012/0099218 A1 | 4/2012 | Kurita | |
| 2012/0105999 A1 | 5/2012 | Chen | |
| 2012/0113207 A1* | 5/2012 | Zheng | 347/209 |
| 2012/0120519 A1 | 5/2012 | Kunkel et al. | |
| 2012/0120521 A1 | 5/2012 | Kurita | |
| 2012/0120522 A1 | 5/2012 | Johnson et al. | |
| 2012/0120527 A1 | 5/2012 | Kunkel et al. | |
| 2012/0120528 A1 | 5/2012 | Furukawa | |
| 2012/0120982 A1 | 5/2012 | Anaya-Dufresne et al. | |
| 2012/0201108 A1 | 8/2012 | Zheng et al. | |
| 2013/0250446 A1 | 9/2013 | Zeng et al. | |
| 2013/0250455 A1 | 9/2013 | Zeng et al. | |
| 2014/0023108 A1 | 1/2014 | Johnson et al. | |
| 2014/0029402 A1 | 1/2014 | Zheng et al. | |
| 2014/0269838 A1* | 9/2014 | Macken | 374/183 |

FOREIGN PATENT DOCUMENTS

| | | |
|---|---|---|
| JP | 10049927 | 2/1998 |
| JP | 20030297029 | 10/2003 |
| JP | 2008097760 | 4/2008 |
| JP | 2008112545 | 5/2008 |
| JP | 2008186549 | 8/2008 |
| JP | 2009129532 | 6/2009 |
| KR | 1020110108181 | 10/2011 |
| WO | WO2012068399 | 5/2012 |

OTHER PUBLICATIONS

File History for U.S. Appl. No. 13/299,094 as retrieved from the U.S. Patent and Trademark Office on May 27, 2014, 163 pages.
File History for U.S. Appl. No. 13/299,139 as retrieved from the U.S. Patent and Trademark Office on May 27, 2014, 218 pages.
File History for U.S. Appl. No. 12/941,461 as retrieved from the U.S. Patent and Trademark Office on May 27, 2014, 156 pages.
File History for U.S. Appl. No. 14/016,645 as retrieved from the U.S. Patent and Trademark Office on Aug. 12, 2014, 113 pages.
File History for U.S. Appl. No. 14/287,419 as retrieved from the U.S. Patent and Trademark Office on Aug. 12, 2014, 98 pages.
International Search Report and Written Opinion dated Feb. 28, 2012 for PCT Application No. PCT/US2011/061233, 12 pages.
International Search Report and Written Opinion dated Feb. 28, 2012 for PCT Application No. PCT/US2011/061236, 11 pages.
International Preliminary Report on Patentability dated May 30, 2013 for PCT Application No. PCT/US2011/061233, 8 pages.
International Preliminary Report on Patentability dated May 30, 2013 for PCT Application No. PCT/US2011/061236, 7 pages.
Korean Office Action with translation dated Jan. 20, 2014 for KR Application No. 10-2012-0130952, 11 pages.
www.allaboutcircuits.com, "Kirchhoff's Voltage Law (KVL): Divider Circuits and Kirchhoff's Laws," Jul. 14, 2014, 12 pages.
Schreck et al., "Thin Film Thermocouple Sensors for Measurement of Contact Temperatures During Slider Asperity Interaction on Magnetic Recording Disks," IEEE Transactions on Magnetics, vol. 28, No. 5, Sep. 1992, pp. 2548-2550.
File History for U.S. Appl. No. 14/287,419 as retrieved from the U.S. Patent and Trademark Office on Dec. 19, 2014, 146 pages.
File History for U.S. Appl. No. 14/457,694 as retrieved from the U.S. Patent and Trademark Office on Oct. 1, 2014, 125 pages.
File History for U.S. Appl. No. 14/287,412 as retrieved from the U.S. Patent and Trademark Office on Dec. 19, 2014, 145 pages.
File History for U.S. Appl. No. 14/016,645 as retrieved from the U.S. Patent and Trademark Office on Nov. 24, 2014, 130 pages.
File History for U.S. Appl. No. 13/298,712 as retrieved from the U.S. Patent and Trademark Office on Nov. 24, 2014, 152 pages.
Office Action dated Nov. 4, 2014 for JP Application No. 2013-540023, 2 pages.
Office Action dated Nov. 25, 2014 for JP Application No. 2013-136342, 4 pages.
European Search Report dated Mar. 4, 2013 for EP Application No. 12192502.8, 6 pages.

* cited by examiner

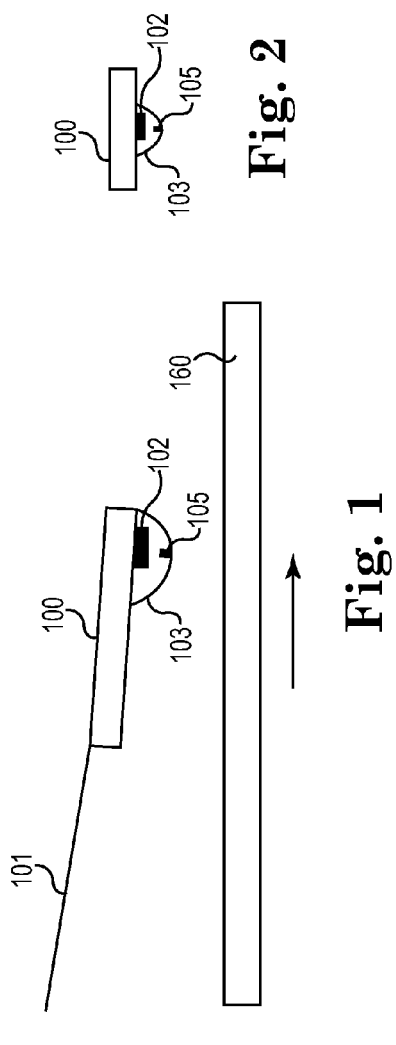

HEAD TRANSDUCER WITH MULTIPLE RESISTANCE TEMPERATURE SENSORS FOR HEAD-MEDIUM SPACING AND CONTACT DETECTION

RELATED PATENT DOCUMENTS

This application is a continuation of U.S. Ser. No. 13/299,139 filed Nov. 17, 2011, which claims the benefit of Provisional Patent Application Ser. Nos. 61/414,733 and 61/414,734 both filed on Nov. 17, 2010, to which priority is claimed pursuant to 35 U.S.C. §119(e) and which are hereby incorporated herein by reference in their respective entirety.

SUMMARY

Embodiments of the disclosure are directed to an apparatus which includes a head transducer configured to interact with a magnetic recording medium, a first sensor having a temperature coefficient of resistance (TCR) and configured to produce a first sensor signal, and a second sensor having a TCR and configured to produce a second sensor signal. One of the first and second sensors is situated at or near a close point of the head transducer in relation to the magnetic recording medium, and the other of the first and second sensors spaced away from the close point. Circuitry is configured to combine the first and second sensor signals and produce a combined sensor signal indicative of one or both of a change in head-medium spacing and head-medium contact. The first sensor may include one of a positive TCR and a negative TCR, and the second sensor may include the other of the positive TCR and the negative TCR.

In accordance with other embodiments, the first and second sensor are arranged to define a differential resistance temperature sensor. Circuitry is configured to combine the first and second sensor signals to produce a differential signal indicative of one or both of the change in head-medium spacing and head-medium contact. A detector is configured to detect one or both of the head-medium spacing change and head-medium contact using the differential signal.

Various method embodiments involve sensing, with a head transducer moving relative to a magnetic recording medium, one or both of a change in head-medium spacing and head-medium contact using a first sensor having a coefficient of resistance (TCR). Methods also involve sensing a change in temperature due to factors other than head-medium spacing change and head-medium contact using a second sensor having a TCR. A first sensor signal is produced by the first sensor and a second sensor signal is produced by the second sensor. Methods further involve generating a combined sensor signal indicative of one or both of the change in head-medium spacing and head-medium contact using the first and second sensor signals, and detecting one or both of the change in head-medium spacing and head-medium contact using the combined sensor signal. In some embodiments, the first sensor comprises one of a positive TCR and a negative TCR, and the second sensor comprises the other of the positive TCR and the negative TCR. In other embodiments, the first and second sensor are arranged to define a differential resistance temperature sensor.

In accordance with various embodiments, an apparatus includes a head transducer configured to interact with a magnetic recording medium and a differential resistance temperature sensor supported by the head transducer. The differential resistance temperature sensor includes a first sensor having a temperature coefficient of resistance and situated at or near a close point of the head transducer in relation to the magnetic recording medium, and a write element of the head transducer spaced away from the first sensor. A detector is configured to detect one or both of a head-medium spacing change and head-medium contact using a differential signal generated by the differential resistance temperature sensor.

According to other embodiments, an apparatus includes a head transducer configured to interact with a magnetic recording medium, and a heater configured to actuate the head transducer. A sensor is situated at the head transducer and has a temperature coefficient of resistance. The sensor is configured to sense for contact between the head transducer and the medium. A detector is coupled to the sensor and the heater, and configured to detect head-medium contact using a detection metric based on a change in resistance of the sensor and a change in heater power. The detection metric may be based on a rate of change in resistance of the sensor and a rate of change in heater power. For example, the detection metric may be defined by a ratio $\Delta R/\Delta P$, where $\Delta R$ is a rate of change in resistance of the sensor and $\Delta P$ a rate of change in heater power. In some embodiments, the detector is configured to make a direct in situ measurement of $\Delta R/\Delta P$.

These and other features and aspects of various embodiments may be understood in view of the following detailed discussion and accompanying drawings.

BRIEF DESCRIPTION OF THE DRAWINGS

FIG. 1 is a simplified side view of a heater-actuated head transducer arrangement which incorporates a TCR sensor in accordance with various embodiments;

FIG. 2 is a front view of the heater-actuated head transducer arrangement shown in FIG. 1;

FIG. 3 shows the heater-actuated head transducer arrangement of FIGS. 1 and 2 in a pre-actuated configuration and an actuated configuration;

DETAILED DESCRIPTION

Figure 4A:
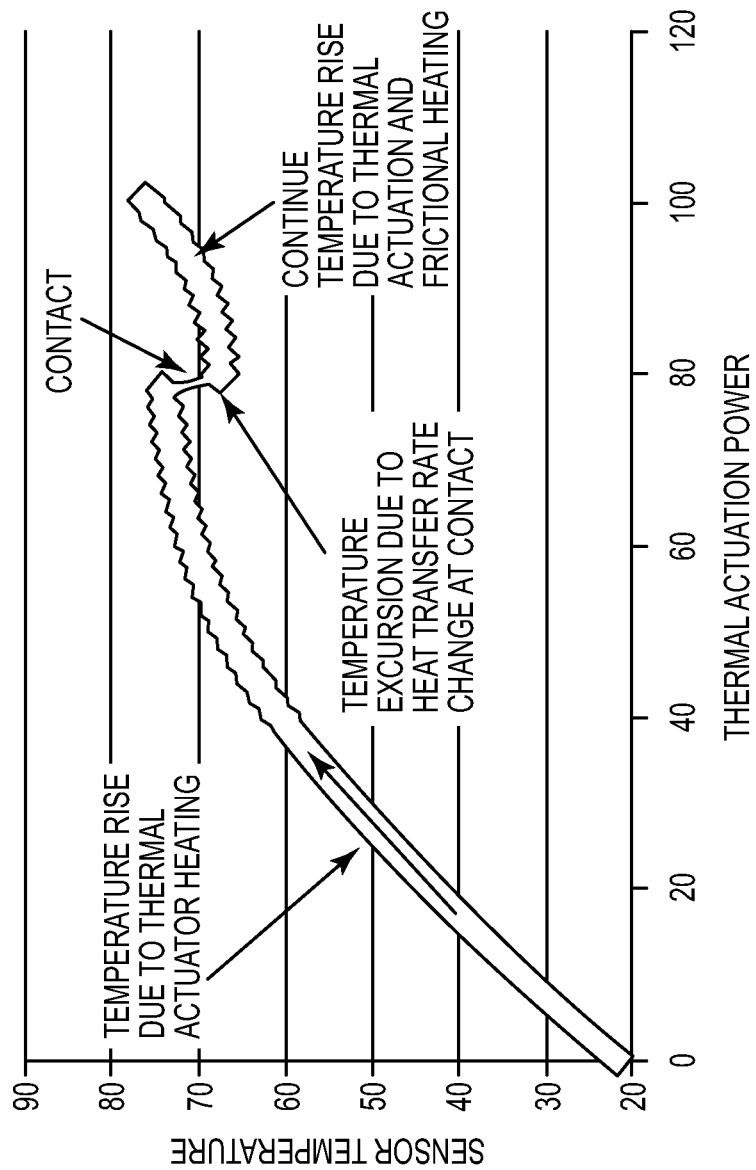
FIG. 4A illustrates a representative temperature profile for a heater-actuated recording head transducer of the type shown in FIGS. 1-3 before, during, and after contact between the head transducer and a surface of a magnetic recording disk.

Data storage systems commonly include one or more recording heads that read and write information to a recording medium. It is often desirable to have a relatively small distance or spacing between a recording head and its associated media. This distance or spacing is known as "fly height" or "head-media spacing." By reducing the head-media spacing, a recording head is typically better able to both write and read data to and from a medium. Reducing the head-media spacing also allows for surveying of recording medium topography, such as for detecting asperities and other features of the recording medium surface.

In accordance with various embodiments, and with reference to FIGS. 1-3, a slider 100 is shown supported by a suspension 101 in close proximity to a rotating magnetic storage medium 160. The slider 100 supports a recording head transducer 103 and a heater 102 thermally coupled to the head transducer 103. The heater 102 may be a resistive heater that generates thermal heat as electrical current is passed through the heater 102. The heater 102 is not limited to resistive heaters, and may include any type of heating source. The thermal energy generated by the heater 102 causes thermal expansion of the head transducer 103. This thermal expansion can be used to reduce the head-media spacing 107 in a data storage system. It is noted that, in some embodiments, a non-thermal actuator can be used to reduce the head-media spacing 107.

A TCR sensor 105 is shown situated on the head transducer 103 at the close point to the magnetic recording medium 160. The close point is generally understood to be the closest point of contact between the head transducer 103 and the magnetic recording medium 160. As discussed previously, actuation of the head transducer 103 can be realized by a thermal actuator, such as the heater 102, or other actuator (e.g., a writer). Bias power is applied to the TCR sensor 105 to raise the surface temperature of the sensor 105 and adjacent portion of the head transducer 103 to be substantially higher than the temperature of the magnetic recording medium 160.

The TCR sensor 105 is preferably configured to sense changes in heat flow for detecting asperities of the medium 160 and head-media contact. Details concerning head-media spacing and contact determinations in accordance with various embodiments of the disclosure are provided in commonly owned U.S. patent application Ser. No. 12/941,461 filed Nov. 8, 2010 which is incorporated herein by reference.

As is depicted in FIG. 3, before head-media contact, there is an air gap 107 defined between the hot head surface and the relatively cool disk 160. The head transducer 103, air gap 107, and magnetic recording disk 160 define one level of heat transfer rate. When the head transducer 103 is in contact with the disk 160, such as after activation of the thermal actuator or heater 102, the direct contact between the high thermal conductivity materials of the head transducer 103 and the disk 160 significantly increases the heat transfer rate. As such, the TCR sensor 105 on the head transducer 103 senses a drop of temperature or an excursion of temperature trajectory, allowing for detection of head-media contact.

FIG. 4A illustrates a representative temperature profile for a recording head transducer 103 of the type shown in FIGS. 1-3 before, during, and after contact between the head transducer 103 and a surface of the magnetic recording disk 160. In this illustrative example, the temperature profile is represented as a steady state DC signal. When the head transducer 103 is actuated by a thermal actuator 102, the head transducer surface temperature will increase with the actuation due to the heat generated by the thermal actuator 102. The head transducer temperature will be higher than the temperature of the disk 160. As such, the disk 160 acts as a heat sink in this scenario.

When the head transducer 103 contacts the disk 160, the head transducer surface temperature will drop due to a change in heat transfer rate resulting from the contact. The head transducer surface temperature will continue to increase due to thermal actuator heating and frictional heating. The change in temperature or excursion in temperature trajectory can be used to declare head-media contact.

Figure 4B:
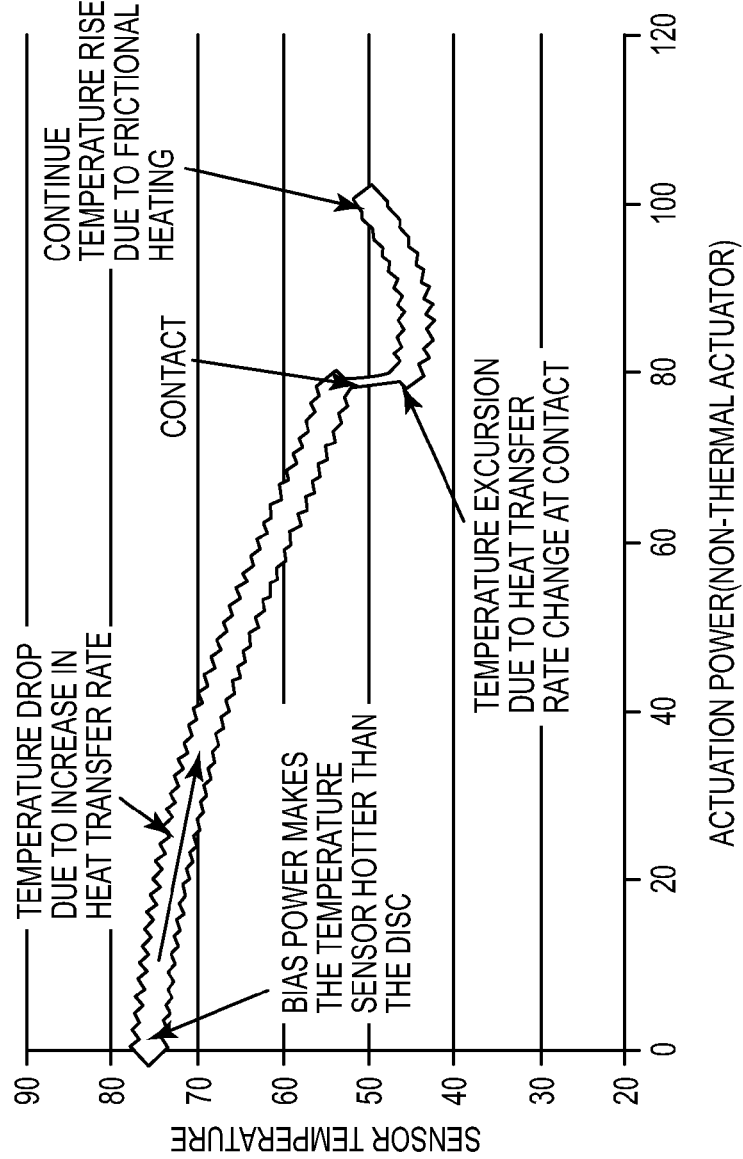
FIG. 4B illustrates a representative temperature profile for a non-thermal actuatable recording head transducer before, during, and after contact between the head transducer and a surface of a magnetic recording disk.

FIG. 4B illustrates a representative temperature profile for a recording head transducer 103 which is actuated by a non-thermal actuator. In this illustrative example, the TCR sensor 105 bias power self-heats the TCR sensor to a temperature substantially higher than the temperature of the disk 160. The disk 160 acts as a heat sink in this scenario. When the head transducer 103 is actuated down toward the disk 160, the heat transfer rate increases gradually, which causes a gradual temperature decrease in the TCR sensor temperature. When the head transducer 103 comes into contact with the disk 160, there will be a change in heat transfer rate, causing a head transducer surface temperature excursion. The TCR sensor 105 on the head transducer surface measures this temperature excursion to detect head-media contact. Should further actuation into head-media contact occur, the temperature will eventually increase due to frictional heating.

Embodiments of the disclosure are directed to methods and apparatus for determining head-media spacing and detecting contact at the head-disk interface based on two resistive temperature sensors with different signs of temperature coefficient of resistance (TCR). Embodiments of the disclosure involve using multiple resistance temperature sensors with different signs of temperature coefficient of resistance located at different locations inside the slider, analyzing the output of the sensors, and using the output to provide feedback of the drive operation condition.

Head-media contact detection and/or head-media spacing sensing technologies are critical for the performance and reliability of hard disk drives. Higher contact detection repeatability enables lower active clearance, and thus higher recording density. Higher contact detection sensitivity reduces wear and improves reliability. Embodiments of the disclosure provide for head-media contact detection and spacing sensing using two sensors, one with a positive TCR, the other with negative TCR, which advantageously eliminates the requirement of any extra electrical connection pads.

In accordance with various embodiments, methods involve detecting head-media contact using two resistance temperature sensors, one with a positive TCR, the other with a negative TCR. These sensors are preferably embedded in different locations in the slider. For example, one sensor can be located near the close point so that its response is sensitive to change in head-media spacing, head-to-disk contact, and other events such as heater-induced temperature rise and/or environmental temperature fluctuations. The other sensor can be located away from the close point so that its response is only sensitive to events such as heater-induced temperature rise and/or environmental temperature fluctuations.

Because the two sensors have different signs of TCR, the combined output of the two sensors with specific combination of resistance and TCR values will only contain the head-media spacing and/or head-to-disk contact contributions. Thus, the combined output can be used to sense head-media spacing change and/or contact events without the requirement of an extra electrical connection pad. The fact that this technique does not require extra electrical connection pads is significant for simplicity of the head design, reduction of cost, and improvement in reliability.

Figure 5A:
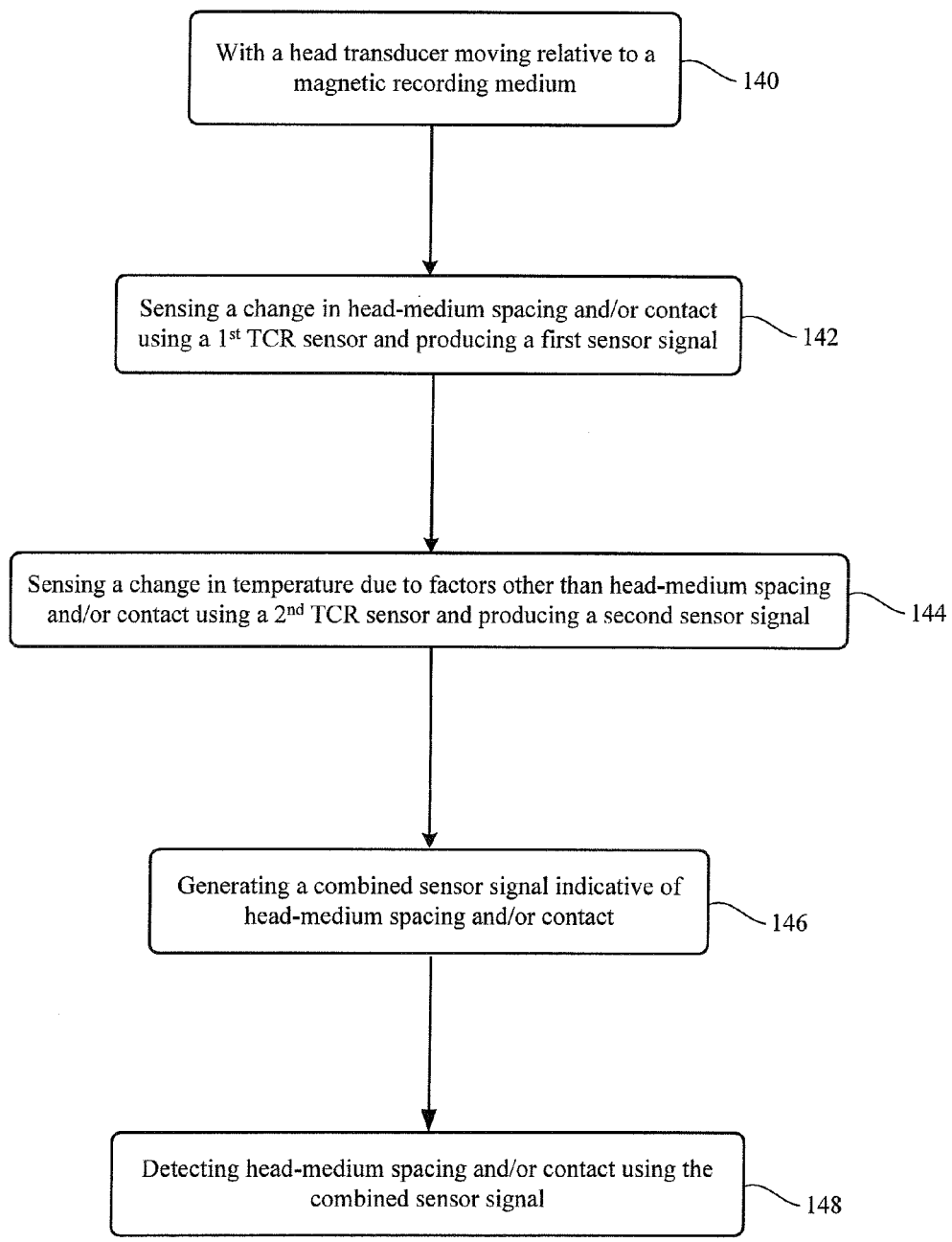
FIGS. 5A and 5B are flow charts showing various processes of methods for detecting head-media contact and/or head-media spacing changes in accordance with various embodiments.

FIG. 5A is a flow chart showing various processes of a method for detecting head-media contact and/or head-media spacing changes in accordance with embodiments of the disclosure. With a head transducer comprising a slider moving 140 relative to a magnetic recording medium, a method involves sensing 142 a change in a change in head-medium spacing and/or head-medium contact using a first TCR sensor, and producing a first sensor signal. The method also involves sensing 144 a change in temperature due to factors other than head-medium spacing and/or head-medium contact using a second TCR sensor, and producing a second sensor signal. The method shown in FIG. 5A further involves generating 146 a combined sensor signal indicative of head-medium spacing and/or head-medium contact, and detecting 148 head-medium spacing and/or head-medium contact using the combined sensor signal.

Figure 5B:
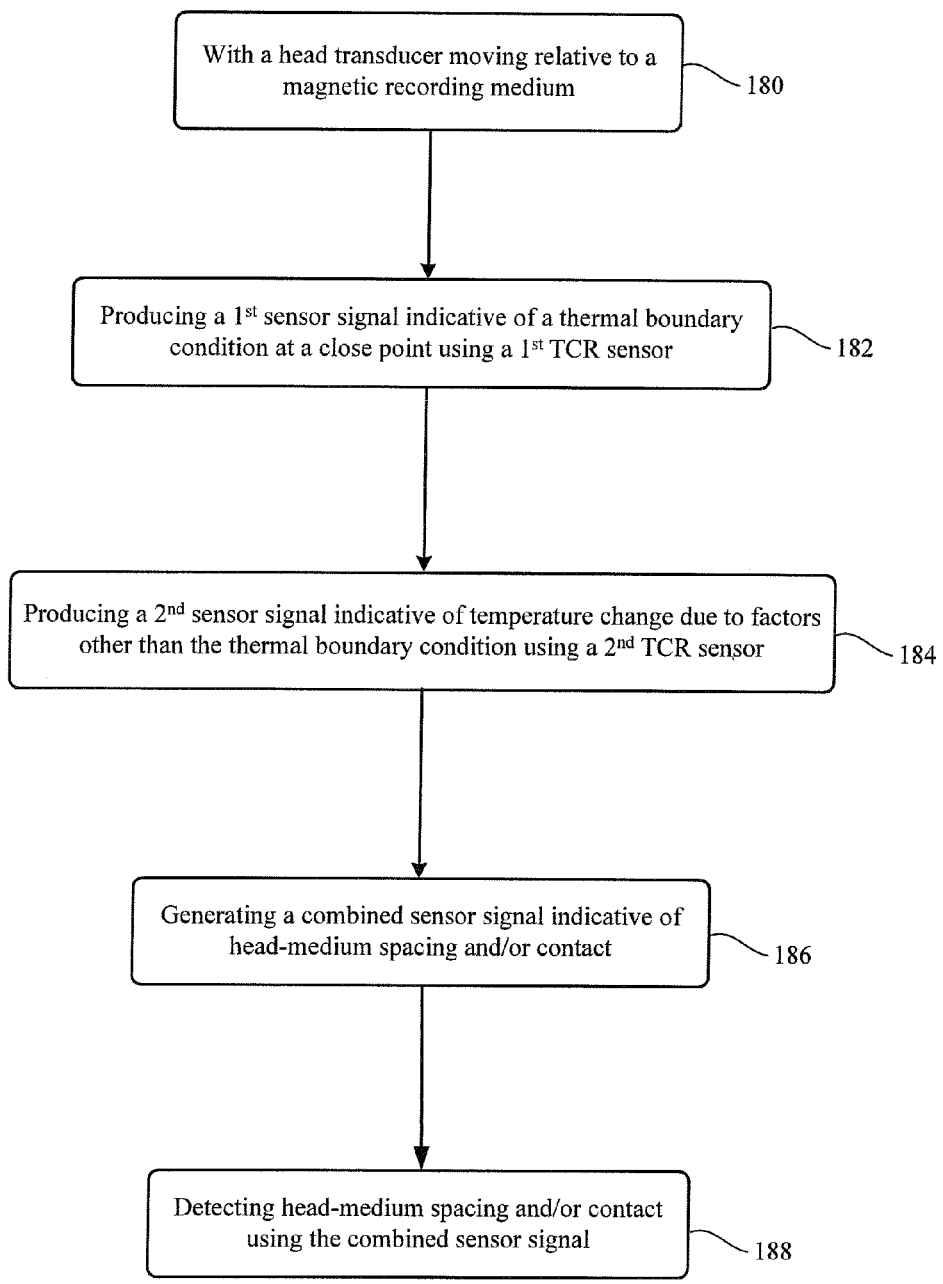

FIG. 5B is a flow chart showing various processes of a method for detecting head-media contact and/or head-media spacing changes in accordance with various embodiments. With a head transducer comprising a slider moving 180 relative to a magnetic recording medium, a method involves producing 182 a first sensor signal indicative of a thermal boundary condition at a close point of the head transducer relative to the medium using a first TCR sensor. The method also involves producing a second sensor signal indicative of temperature change due to factors other than those influenced by the thermal boundary condition using a second TCR sensor. The method further involves generating 186 a combined sensor signal indicative of head-medium spacing and/or head-medium contact, and detecting 188 head-medium spacing and/or head-medium contact using the combined sensor signal.

Figure 6A:
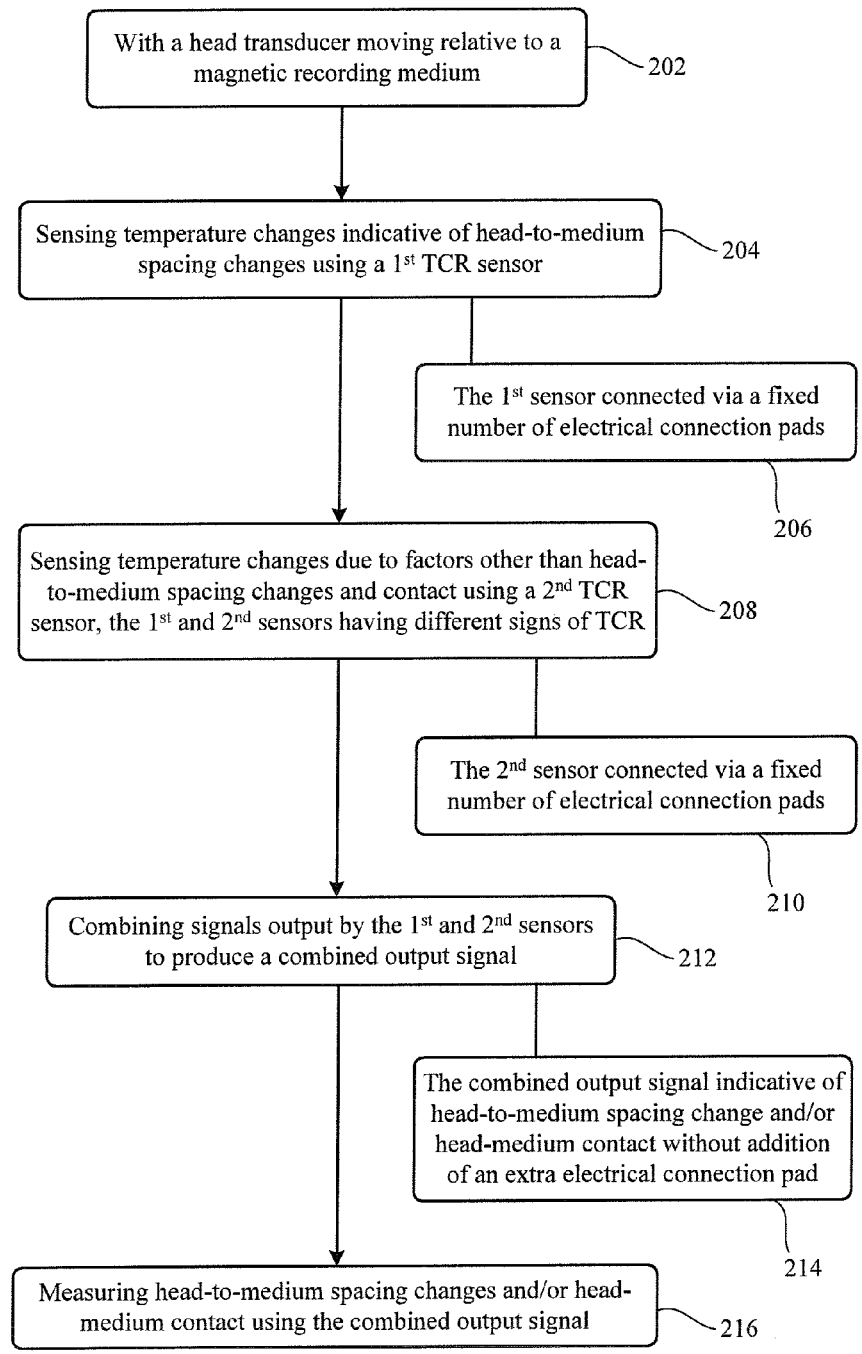
FIGS. 6A and 6B are flow charts showing various processes of methods for detecting head-media contact and/or head-media spacing changes in accordance with various embodiments.

FIG. 6A is a flow chart showing various processes of a method for detecting head-media contact and/or head-media spacing changes in accordance with embodiments of the disclosure. With a head transducer comprising a slider moving 202 relative to a magnetic recording medium, changes in temperature indicative of head-medium spacing changes are sensed 204 using a first TCR sensor. The first TCR sensor is supported by the head transducer and is connected 206 via a fixed number of electrical connection pads (e.g., 2). The method also involves sensing 208 temperature changes due to factors other than head-medium spacing changes and contact using a second TCR sensor also connected 210 via a fixed number of electrical connection pads (e.g., 2). The first and second TCR sensors have different signs of TCR, one positive and the other negative. The method further involves combining 212 signals output by the first and second TCR sensors to produce a combined output signal indicative of head-medium spacing change and/or head-medium contact. Head-medium spacing changes and/or head-medium contact is measured 216 using the combined output signal. Notably, making temperature-based head-medium contact and head-medium spacing change measurements is achieved without addition 214 of an extra electrical connection pad.

Figure 6B:
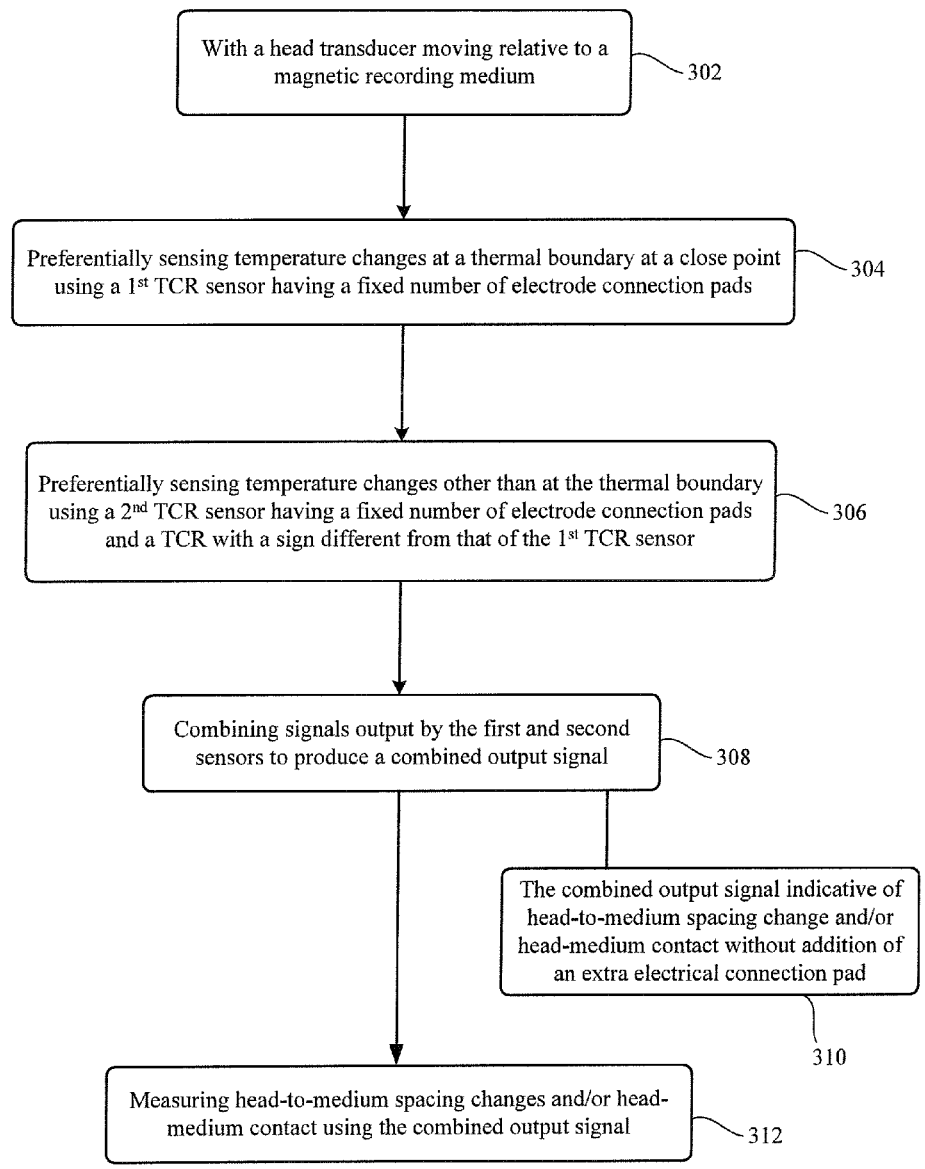

FIG. 6B is a flow chart showing various processes of a method for detecting head-media contact and/or head-media spacing changes in accordance with various embodiments. With a head transducer comprising a slider moving 302 relative to a magnetic recording medium, the method involves preferentially sensing 304 temperature changes at a thermal boundary at a close point of the head transducer using a first TCR sensor having a fixed number of electrode connection pads. The method also involves preferentially sensing 306 temperature changes other than at the thermal boundary using a second TCR sensor having a fixed number of electrode connection pads and a TCR with a sign different from that of the first TCR sensor. Signals output by the first and second sensors are used to produce 308 a combined output signal indicative of head-medium spacing change and/or head-medium contact. As in the embodiments illustrated in FIG. 6A above, making temperature-based head-medium contact and head-medium spacing change measurements 312 is achieved without addition 310 of an extra electrical connection pad.

Figure 7:
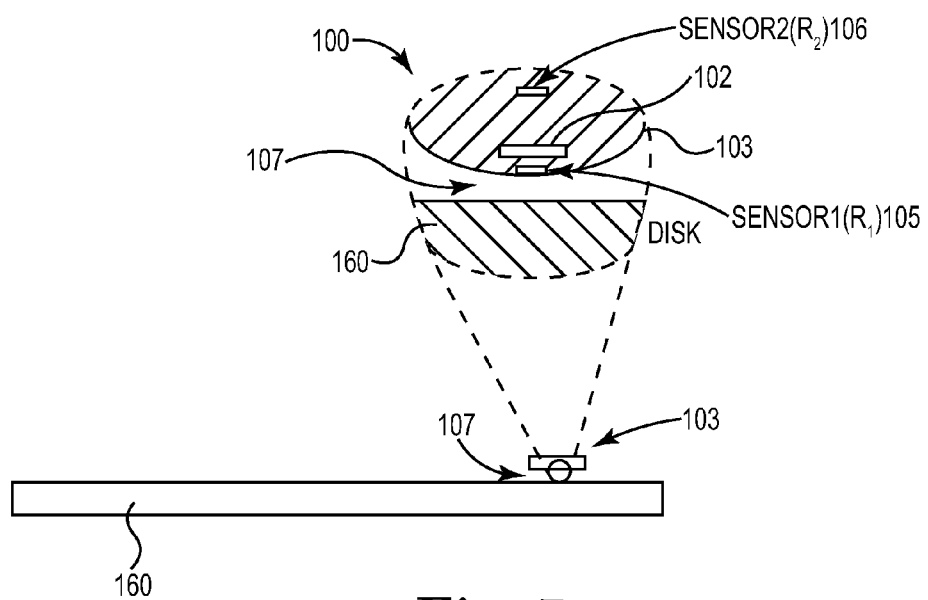
FIG. 7 is a schematic illustration of a portion of a slider which supports a head transducer at a disk interface relative to a surface of a magnetic storage medium in accordance with various embodiments.

FIG. 7 is a schematic illustration of a portion of a slider 100, which supports a head transducer 103 at a disk interface relative to a surface of a magnetic storage medium 160 in accordance with embodiments of the disclosure. The schematic illustration shown in FIG. 7 can define, for example, a disk interface in a magnetic recording hard drive. In FIG. 7, it is assumed that the disk is spinning at a high RPM and a recording head 103 is flying several nanometers away from the surface of the disk 160 with the spacing controlled by the air bearing. To further bring the head 103 closer to the surface of the disk 160, a heater element 102 embedded in the head 103 is actuated to create thermal expansion in the head 103 and reduce the head-medium spacing.

The heat generated by the heater element 102 and/or the writer coil creates a temperature rise in the head transducer 103. Before contact, the heat is mainly conducted away from the head transducer 103 through an air gap 107 between the disk 160 and the transducer head 103 and into the disk 160. The thermal conductance of the air gap 107 increases as the head-medium spacing decreases and the air pressure increases. When the head transducer 103 contacts the disk 160, the thermal conductance increases dramatically. After the head transducer 103 contacts the disk 160, the resulting frictional heating will generate an extra heat source. The combined effect of different thermal energy transfer mechanisms, such as heater element heating, writer coil heating, air bearing cooling, disk cooling, and frictional heating, for example, results in a characteristic temperature rise at different locations in the head transducer 103 as a function of heater element power, writer current, clearance, and/or contact events. By measuring the temperature as a function of heater power, head-media spacing and/or contact events can be monitored.

Figure 8:
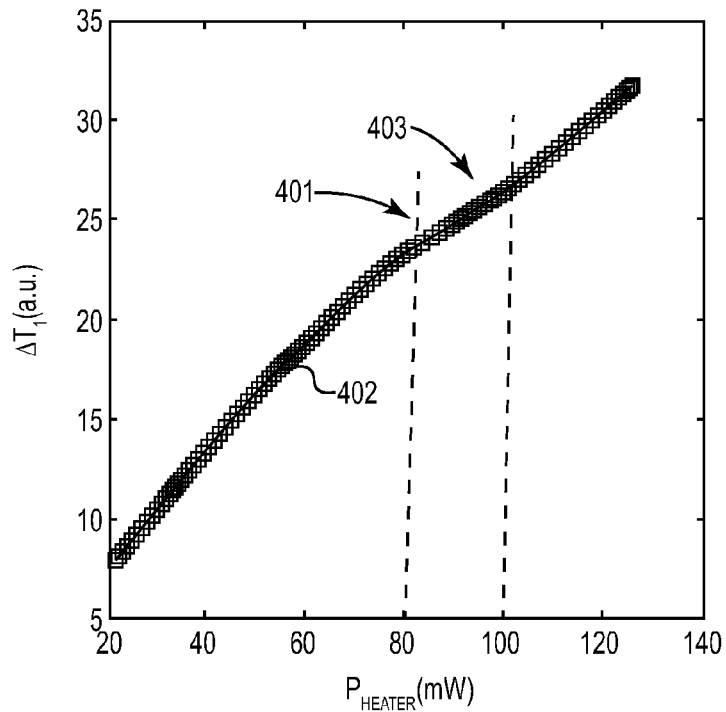
FIGS. 8 and 9 are graphs showing temperature rise as a function of heater power at the two TCR sensor locations depicted in FIG. 7, respectively.

In accordance with various embodiments, and with continued reference to FIG. 7, one TCR sensor, $R_1$ (105), is located near the close point, and the other TCR sensor, $R_2$ (106), is located away from the close point. Situating the TCR sensor $R_1$ (105) at or near the close point provides for preferential sensing of temperature/temperature changes generated at a thermal boundary at the close point of the head transducer 103. Situating TCR sensor $R_2$ (106) away from the close point (e.g., elsewhere on the head transducer 103/slider 100) provides for preferential sensing of temperature/temperature changes generated from thermal sources other than that at or near the close point. Representative examples of temperature rise at the two TCR sensor locations depicted in FIG. 7 are illustrated in FIGS. 8 and 9, respectively.

The temperature rise, $\Delta T_1$, of TCR sensor $R_1$ (105) is shown in temperature curve 402 plotted as a function of heater element power, $P_{heater}$. As can be seen in FIG. 8, the temperature rise of TCR sensor $R_1$ (105) increases as a function of heater element power over the entire heater element power range. The rate of increase slows down gradually when the heater element power is increased from 20 mW to 80 mW due to the increase in thermal conductance of the air gap 107. The temperature curve 402 shows a shoulder 403 between 80 mW and 100 mW (beginning at a location on the temperature curve 402 indicated by arrow 401) because of further increase in cooling due to proximity and/or contact effect. After 100 mW, the rate of temperature rise increases slightly due to frictional heating.

Figure 9:
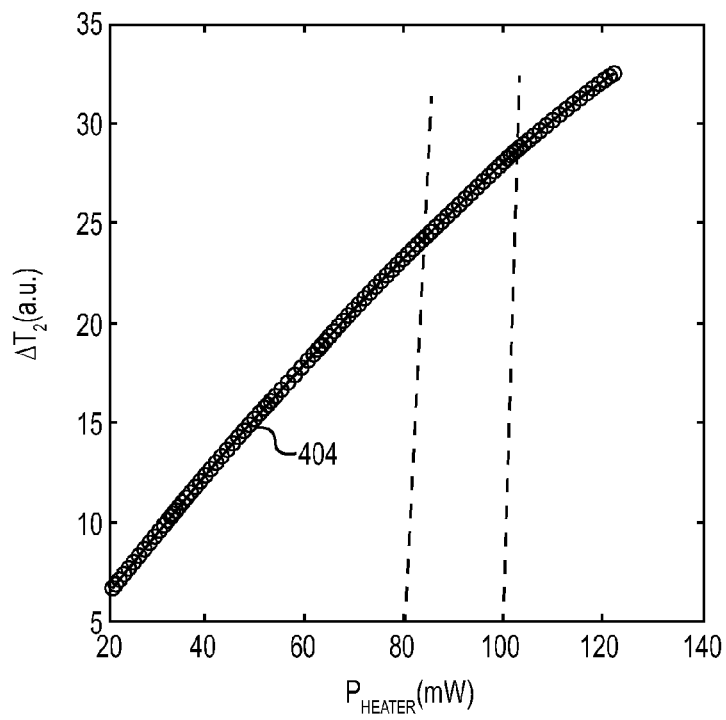

The temperature rise, $\Delta T_2$, of TCR sensor $R_2$ (106) is shown in FIG. 9 also increase as a function of heater element power, but does not have the shoulder (403 shown in FIG. 8) because the TCR sensor $R_2$ (106) is less sensitive to the thermal boundary condition at the close point. It is understood that the temperature curves shown in FIGS. 8 and 9 are provided only for demonstrational purposes. Since temperature distribution in the head transducer 103 can be obtained from a thermomechanical model accurately, locations of the two TCR sensors $R_1$ (105) and $R_2$ (106) can be determined and optimized.

The temperature changes $\Delta T_1$ and $\Delta T_2$ of TCR sensors $R_1$ (105) and $R_2$ (106) produces change in the resistance of these TCR sensors, which can be characterized as follows:

$$R_i = R_{i,0} + R_{i,0}\alpha_i \Delta T_i \quad (1)$$

where $\alpha_i$ is the temperature coefficient of resistance of the TCR sensor $R_1$ (105), and $R_{i,o}$ is the resistance at ambient temperature of TCR sensor $R_1$ (105). By choosing sensor materials with different signs of TCR and combining them in serial or parallel, contact detection signals can be produced without the addition of extra electrical connection pads.

Figure 10:
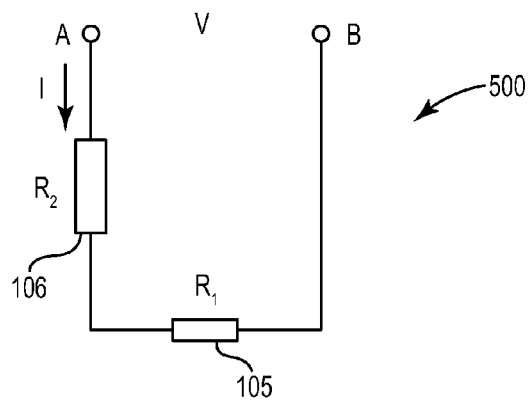
FIG. 10 is a diagram of an equivalent circuit depicting two TCR sensors arranged in series on a head transducer for detecting head-media contact and/or head-media spacing changes in accordance with various embodiments.

FIG. 10 is a diagram of an equivalent circuit 500 depicting two TCR sensors $R_1$ (105) and $R_2$ (106) arranged on a head transducer for detecting head-media contact and/or head-media spacing changes in accordance with various embodiments. In accordance with the representative embodiment shown in FIG. 10, the two TCR sensors $R_1$ (105) and $R_2$ (106) with different signs of temperature coefficient of resistance (i.e., one positive and the other negative) are connected in series. Given a current I, the voltage drop across the two TCR sensors $R_1$ (105) and $R_2$ (106) is given by:

$$V = I(R_1 + R_2) = I(R_{1,0} + R_{1,0}\alpha_1 \Delta T_1 + R_{2,0}\alpha_2 \Delta T_2) \quad (2)$$

where $\Delta T_1$ and $\Delta T_1$ are the temperature changes of the TCR sensors $R_1$ (105) and $R_2$ (106), respectively, $\alpha_1$ and $\alpha_2$ are the temperature coefficients of resistance of the TCR sensors $R_1$ (105) and $R_2$ (106), respectively, and $R_{1,0}$ and $R_{2,0}$ are the resistances at ambient temperature of the TCR sensors $R_1$ (105) and $R_2$ (106).

Figure 11:
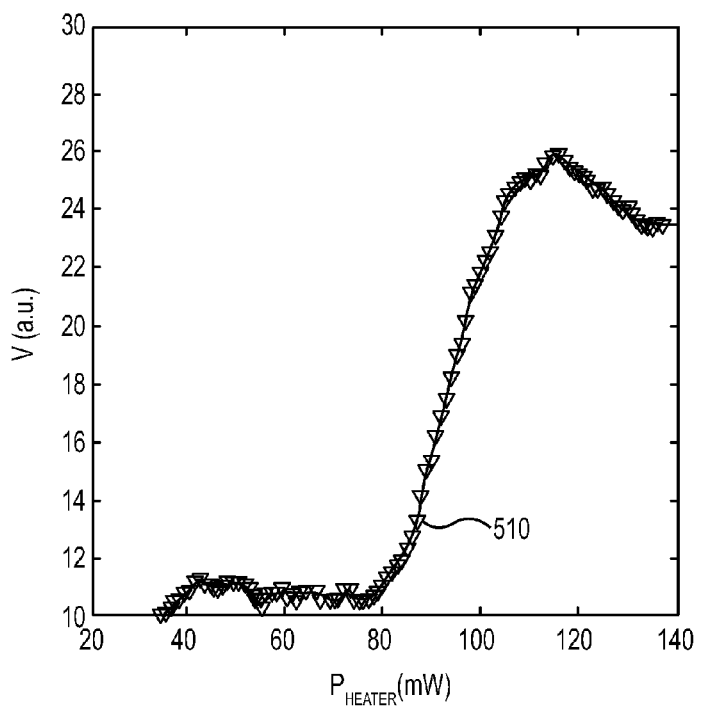
FIG. 11 is a representative curve showing the voltage across electrical connection posts of the circuit of FIG. 10 as a function of heater element power with an apparent contact signature.

By choosing the proper combinations of $R_{1,0}$, $\alpha_1$, $R_{2,0}$, and $\alpha_2$, so that $$R_{1,0}\alpha_1 \Delta T_1 + R_{2,0}\alpha_2 \Delta T_2 = \text{constant} \quad (3)$$

for all heater element power levels before contact, i.e., for heater element power smaller than 60 mW in the illustrative example shown in FIGS. 8 and 9, the resistance change created by the change in the thermal boundary condition near the close point can be amplified. FIG. 11 is a representative curve 510 showing the voltage, V, across posts A and B of the circuit 500 of FIG. 10 as a function of heater element power, $P_{heater}$, with an apparent contact signature. The sudden change in the voltage curve 510 beginning around 80 mV represents onset of head-media contact.

Figure 12:
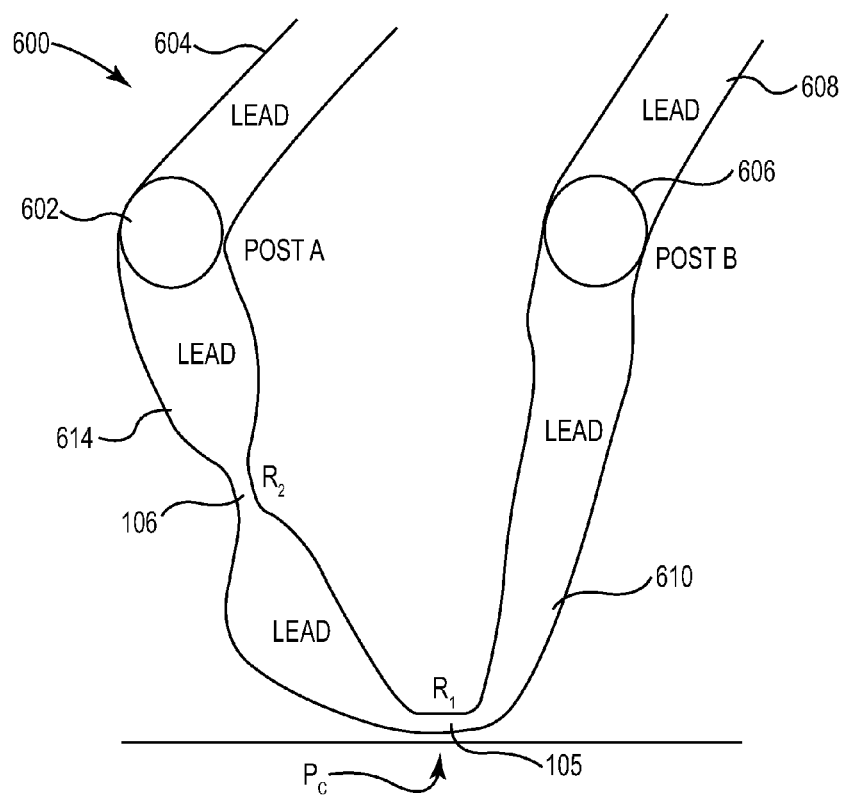
FIG. 12 shows a representative example of a layout of two TCR sensors in a recording head transducer in accordance with various embodiments.

FIG. 12 shows a representative example of the layout 600 of the TCR sensors $R_1$ (105) and $R_2$ (106) in a recording head transducer 103 in accordance with various embodiments. In the layout 600 shown in FIG. 12, the TCR sensor $R_1$ (105) is located at the close point, $P_C$, and the TCR sensor $R_2$ (106) sensor is located away from the close point, $C_P$. The two TCR sensors $R_1$ (105) and $R_2$ (106) are connected in series in this illustrative embodiment between electrical connection pads or posts 602 (Post A) and 606 (Post B) via leads 614 and 610. Leads 604 and 608 are shown connected to electrical connection pads 602 and 606, respectively. The layout 600 illustrated in FIG. 12 shows that TCR sensors $R_1$ (105) and $R_2$ (106) can be incorporated into a recording head transducer using existing leads and without the addition of an extra electrical connection pad.

Figure 13:
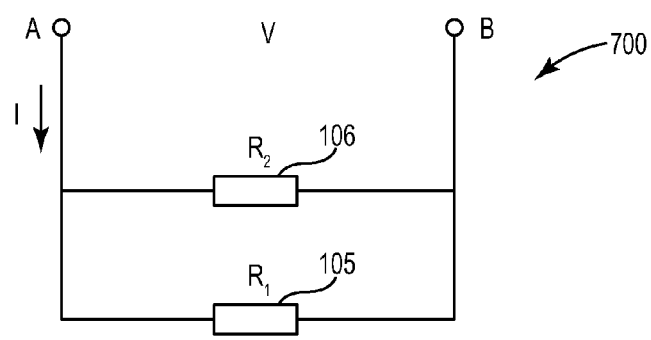
FIG. 13 is a diagram of an equivalent circuit depicting two TCR sensors arranged on a head transducer in parallel for detecting head-media contact and/or head-media spacing changes in accordance with various embodiments.

In accordance with another embodiment, and as shown in the equivalent circuit 700 illustrated in FIG. 13, the two TCR sensors $R_1$ (105) and $R_2$ (106) with different signs of temperature coefficient of resistance (i.e., one positive and the other negative) are connected in parallel. The voltage drop across the combination TCR sensors $R_1$ (105) and $R_2$ (106) is given by:

$$V=IR=I(R_{1,0}+R_{1,0}\alpha_1\Delta T_1)(R_{2,0}+R_{2,0}\alpha_2\Delta T_2)/(R_{1,0}+R_{1,0}\alpha_1\Delta T_1+R_{2,0}+R_{2,0}\alpha_2\Delta T_2) \quad (4)$$

Figure 14:
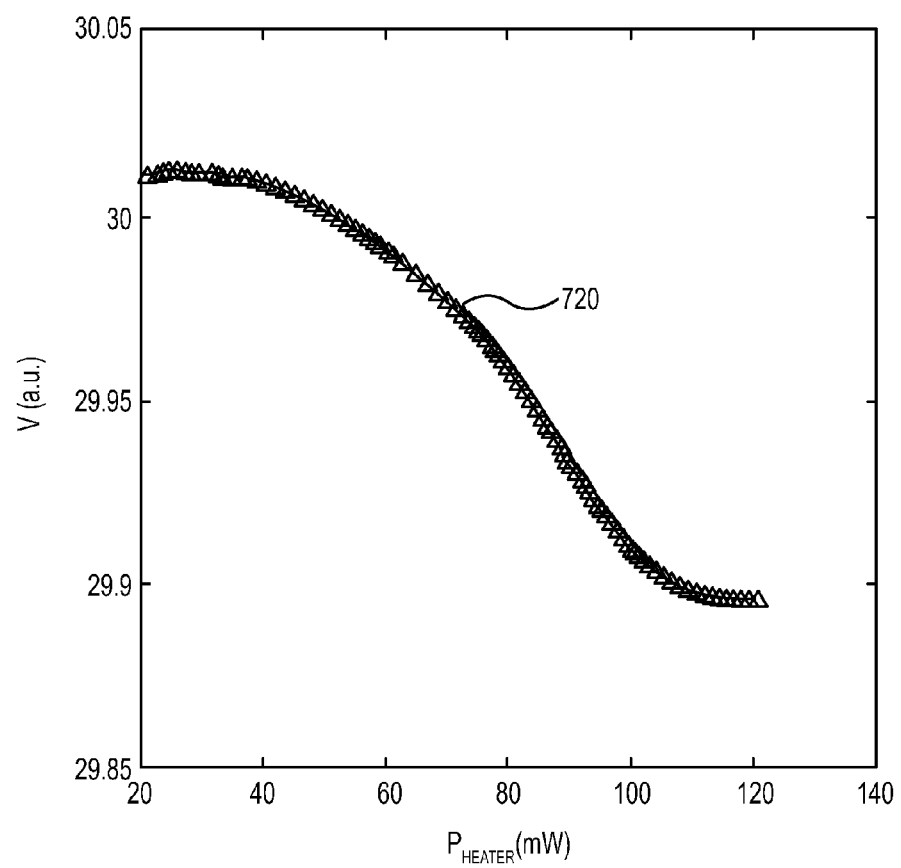
FIG. 14 is a representative curve showing the voltage across posts A and B of the equivalent circuit shown in FIG. 13 as a function of heater element power in accordance with various embodiments.

By choosing a combination of $R_{1,0}$, $\alpha_1$, $R_{2,0}$, and $\alpha_2$, so that $$\alpha_1\Delta T_1+\alpha_2\Delta T_2+\alpha_1\Delta T_1\alpha_2\Delta T_2=\text{constant} \quad (5)$$

and $$R_{1,0}\alpha_1\Delta T_1+R_{2,0}\alpha_2\Delta T_2=\text{constant} \quad (6)$$

for all heater element power levels before contact, i.e., for heater element power smaller than 60 mW in the illustrative example shown in FIGS. 13 and 14, the resistance change created by the change in the thermal boundary condition near the close point can also be amplified. The condition defined by Equation (5) above can be released by omitting the higher order term $\alpha_1\Delta T_1\alpha_2\Delta T_2$, because the TCR of most materials is much smaller than 1.

FIG. 14 is a representative curve 720 showing the voltage, V, across posts A and B of the circuit 700 of FIG. 13 as a function of heater element power, $P_{heater}$. In this representative example, $R_{1,0} \approx R_{2,0}$ and $\alpha_1 \approx \alpha_2$.

Figure 15:
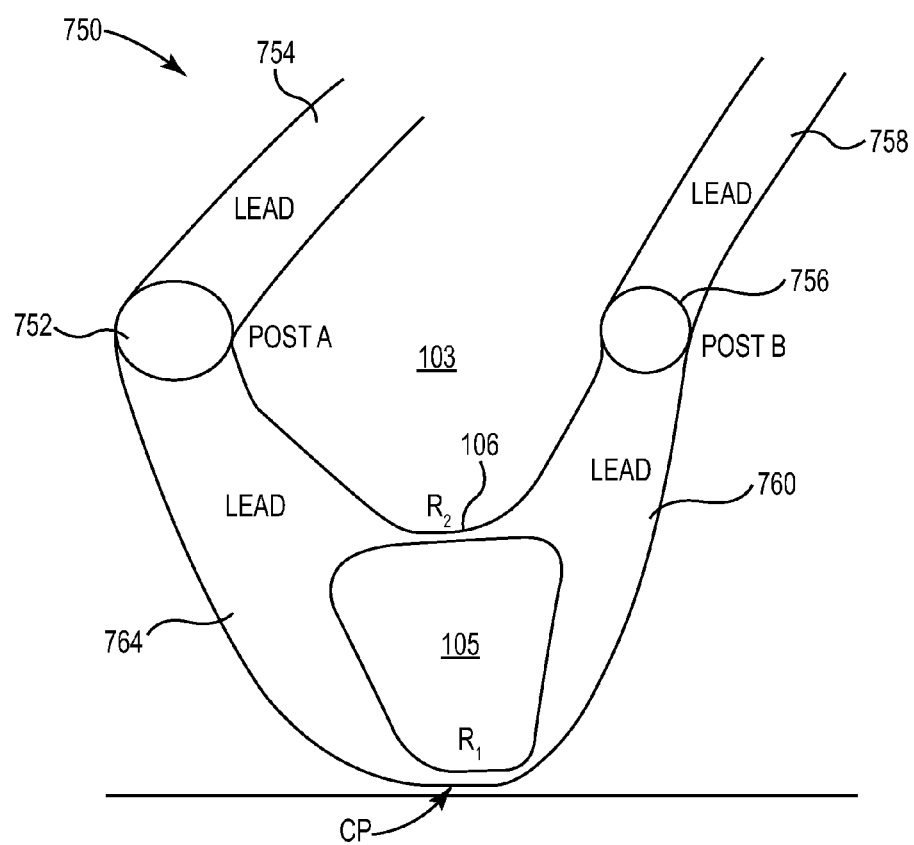
FIG. 15 shows a representative layout of a parallel-connected resistance temperature sensor in a recording head transducer according to various embodiments.

FIG. 15 shows a representative layout 750 of a parallel-connected resistance temperature sensor in a recording head transducer according to various embodiments. In the layout 750 shown in FIG. 15, the TCR sensors $R_1$ (105) and $R_2$ (106) are connected in parallel, with the TCR sensor $R_1$ (105) located at the close point, $P_C$, and the TCR sensor $R_2$ (106) sensor located away from the close point, $C_P$. The two TCR sensors $R_1$ (105) and $R_2$ (106) are connected in parallel in this illustrative embodiment between electrical connection pads or posts 752 (Post A) and 756 (Post B) via leads 764 and 760. Leads 754 and 758 are shown connected to electrical connection pads 752 and 756, respectively. The layout 750 illustrated in FIG. 15 shows that TCR sensors $R_1$ (105) and $R_2$ (106) can be incorporated into a recording head transducer using existing leads and without the addition of an extra electrical connection pad. It is noted that a series-connected resistance temperature sensor arrangement preforms appreciably better than a parallel-connected resistance temperature sensor arrangement.

Various materials with a positive temperature coefficient of resistance that can be used in the construction of a TCR sensor according to embodiments of the disclosure include, but are not limited to, Cr, FeNi alloy, Ni, and W, among others. Various materials with a negative temperature coefficient of resistance that can be used in the construction of a TCR sensor according to embodiments of the disclosure include, but are not limited to, TaN, VO, and $VO_2$, among others.

Embodiments of the disclosure are directed to resistance temperature sensor assemblies that provide for enhanced signal-to-noise ratios (SNRs) due to calibrating out head transducer temperature variation. Embodiments of the disclosure are directed to resistance temperature sensor assemblies that have enhanced SNRs due to calibrating out head transducer temperature variation using existing head transducer electrical elements. For example, various embodiments employ a differential resistance temperature sensor assembly comprising a resistance temperature sensor and a writer coil of the recording head transducer, such as a writer coil for a BCR (Beyond Contact Recording) head. A BCR transducer head has a smaller airbearing feature to produce higher concentrated air pressure at the trailing edge in comparison to conventional transducer heads. A BCR transducer head has low contact modulation.

Figure 16A:
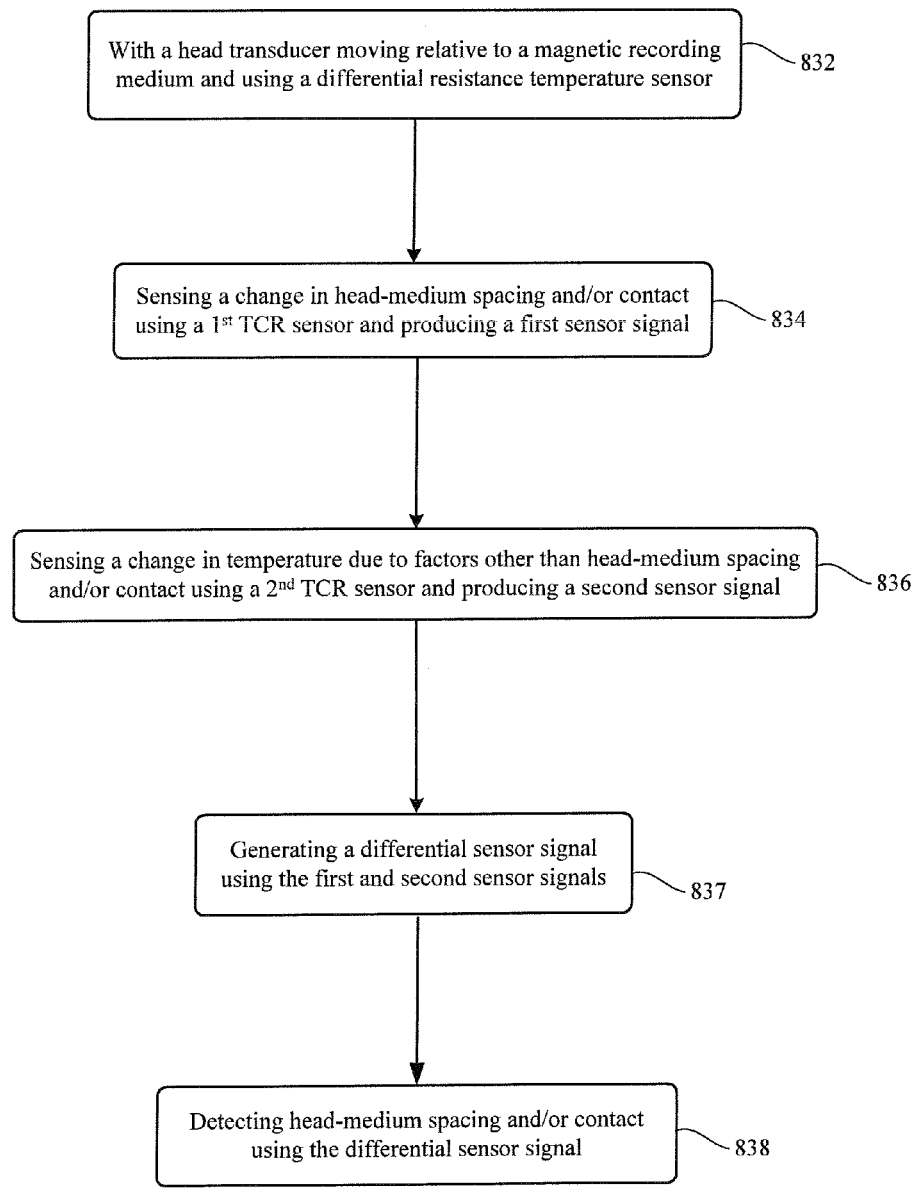
FIGS. 16A and 16B are flow charts showing various processes of methods for detecting head-media contact and/or head-media spacing changes in accordance with various embodiments.
Figure 16B:
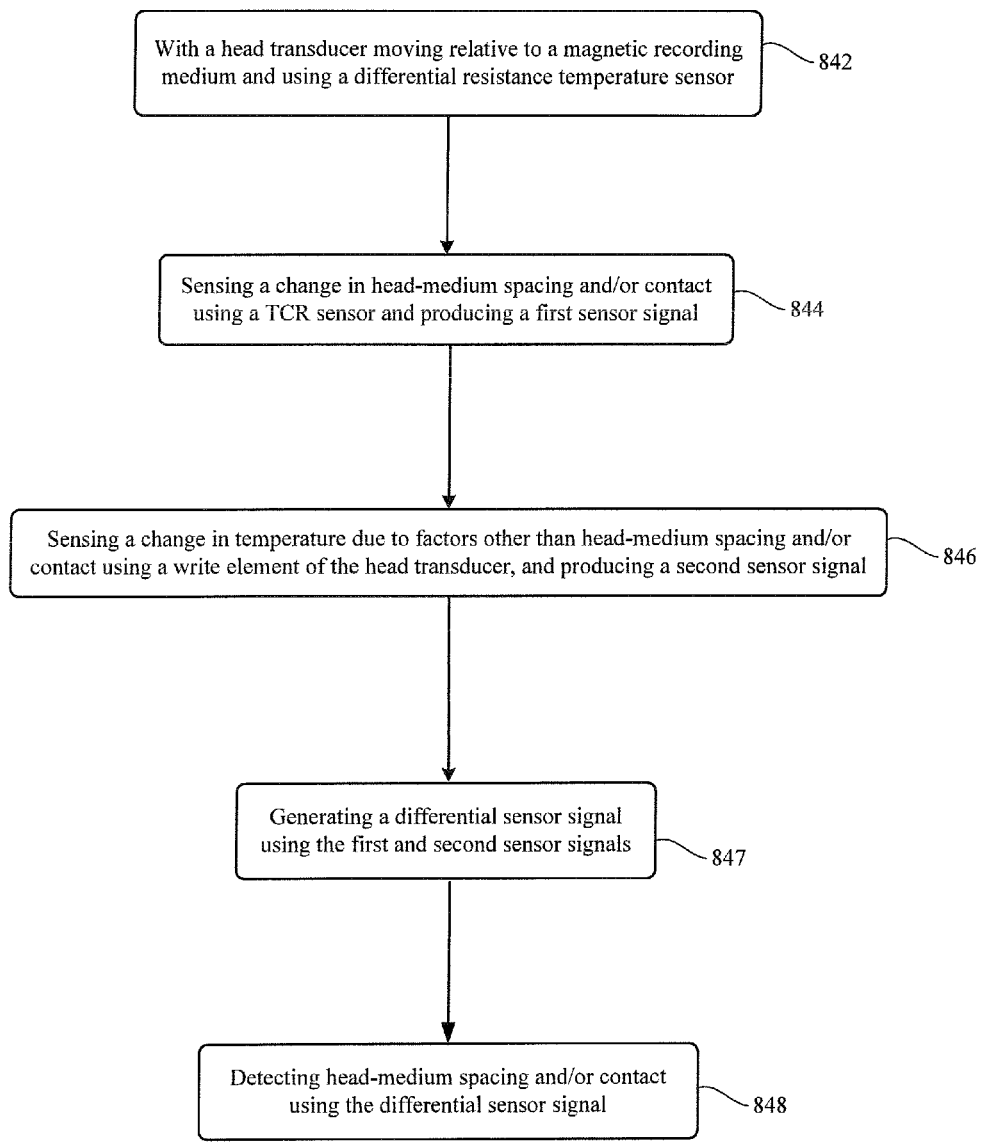

FIGS. 16A and 16B are flow charts showing various processes of methods for detecting head-media contact and/or head-media spacing changes in accordance with various embodiments. According to FIG. 16A, method embodiments involve a head transducer moving relative to a magnetic recording medium and use of a differential resistance temperature sensor 832. The method illustrated in FIG. 16A involves sensing 834 a change in head-medium spacing and/or head-medium contact using a first TCR sensor, and producing a first sensor signal. The method also involves sensing 836 a change in temperature due to factors other than head-medium spacing and/or head-medium contact using a second TCR sensor, and producing a second sensor signal. The method shown in FIG. 16A further involves generating 837 a differential sensor signal using the first and second sensor signals, and detecting 838 head-medium spacing and/or head-medium contact using the differential sensor signal.

In accordance with FIG. 16B, method embodiments involve a head transducer moving relative to a magnetic recording medium and use of a differential resistance temperature sensor 842. The method illustrated in FIG. 16B involves sensing 844 a change in head-medium spacing and/or head-medium contact using a TCR sensor, and producing a first sensor signal. The method also involves sensing 846 a change in temperature due to factors other than head-medium spacing and/or head-medium contact using a write element of the head transducer, and producing a second sensor signal. The method shown in FIG. 16B further involves generating 847 a differential sensor signal using the first and second sensor signals, and detecting 848 head-medium spacing and/or head-medium contact using the differential sensor signal.

Figure 17A:
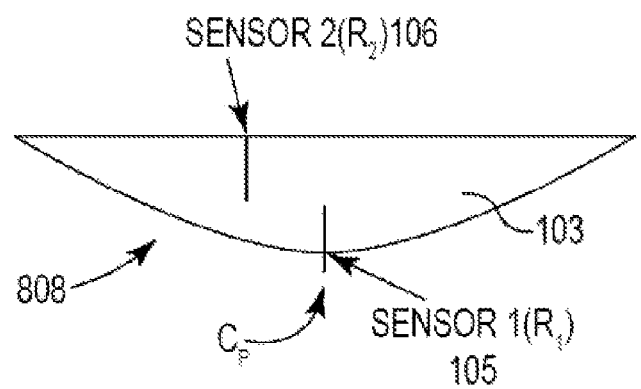
FIG. 17A is an illustration of two TCR sensors arranged on a head transducer for detecting head-media contact and/or head-media spacing changes in accordance with various embodiments.
Figure 17B:
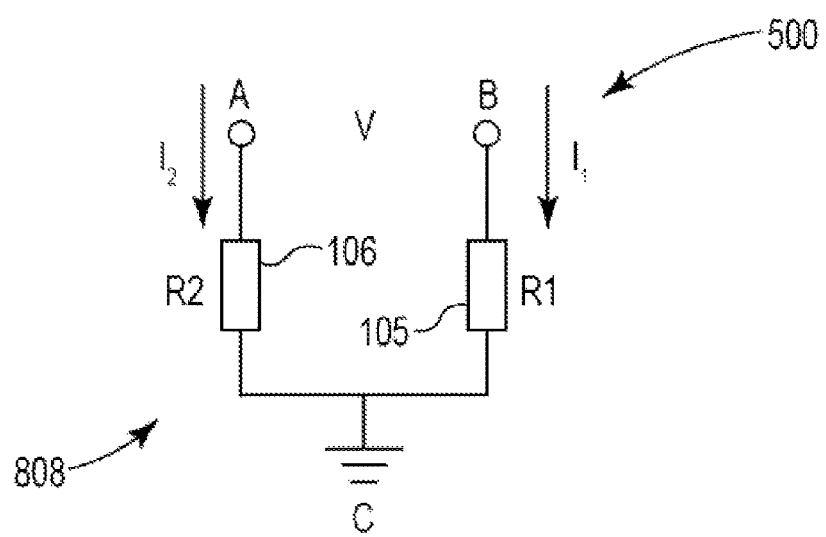
FIG. 17B is a diagram of an equivalent circuit depicting two TCR sensors arranged as a differential resistance temperature sensor in accordance with various embodiments.
Figure 17C:
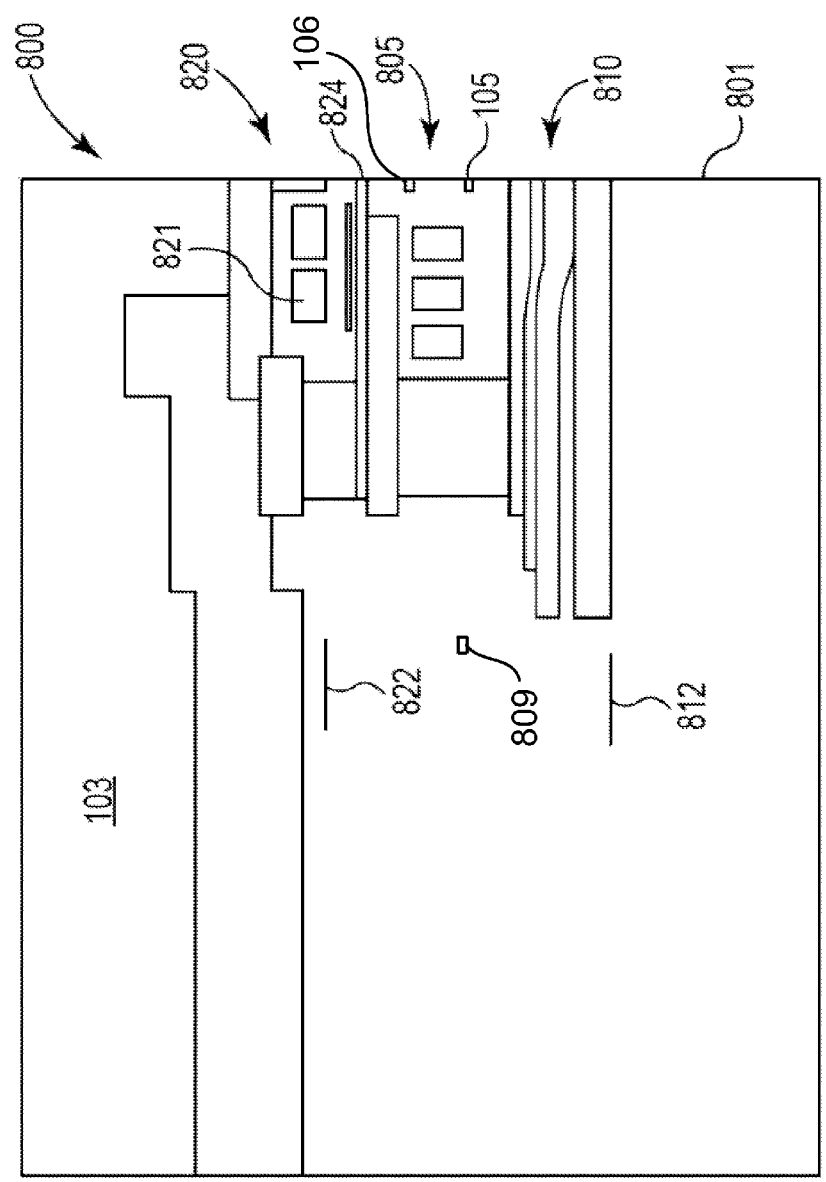
FIG. 17C is a cross-sectional illustration of a trailing section of a slider that supports a recording head transducer and resistance temperature sensor assembly in accordance with various embodiments.

According to various embodiments, and with reference to FIGS. 17A-17C, a resistance temperature sensor assembly 808 provides for improved SNR of head-media contact detection and thermal asperity detection using differential resistance temperature sensors. FIG. 17A is an illustration of two TCR sensors $R_1$ (105) and $R_2$ (106) arranged on a head transducer 103 for detecting head-media contact and/or head-media spacing changes in accordance with various embodiments. More particularly, the two TCR sensors $R_1$ (105) and $R_2$ (106) shown in FIG. 17A are preferably arranged as a differential resistance temperature sensor assembly 808 on a head transducer 103 for detecting head-media contact and/or head-media spacing changes in accordance with various embodiments.

In FIG. 17A, a TCR sensor $R_1$ (105) is located near the close point, $C_P$, of the head transducer 103 and a second TCR sensor $R_2$ (106) is located away from the close point, $C_P$. As discussed previously, situating the TCR sensor $R_1$ (105) at or near the close point, $C_P$, provides for preferential sensing of temperature/temperature changes generated at a thermal boundary at the close point, $C_P$, whereas situating the TCR sensor $R_2$ (106) away from the close point provides for preferential sensing of temperature/temperature changes generated from thermal sources other than that at or near the close point, $C_P$.

FIG. 17B is a diagram of an equivalent circuit 850 depicting the two TCR sensors $R_1$ (105) and $R_2$ (106) arranged as a differential resistance temperature sensor assembly 808. In the representative embodiment shown in FIG. 17B, the two TCR sensors $R_1$ (105) and $R_2$ (106) preferably have the same signs of temperature coefficient of resistance (i.e., either both positive or both negative). In some embodiments, the differential resistance temperature sensor assembly 808 shown 17B may have a center tap that is a live terminal, instead of being coupled to ground.

The differential resistance temperature sensor assembly 808 provides for sensing of the difference in thermal boundary condition at the close point, $C_P$, (as measured using TCR sensor $R_1$ (105)) and at a location away from the close point, $C_P$ (as measured using TCR sensor $R_2$ (106). The differential signal produced by the differential resistance temperature sensor assembly 808 illustrated in FIGS. 17A-17C improves the contact detection SNR by removing the background created by the heater element and environment. It is noted that the common mode noise should be canceled prior to differential signal amplification.

Figure 18A:
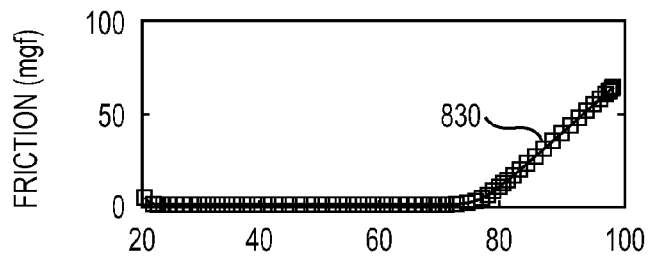
FIGS. 18A-18D are various graphs that demonstrate the efficacy of a resistance temperature sensor assembly that provides for improved signal-to-noise ratio of head-media contact detection and thermal asperity detection using differential resistance temperature sensors in accordance with various embodiments.
Figure 18B:
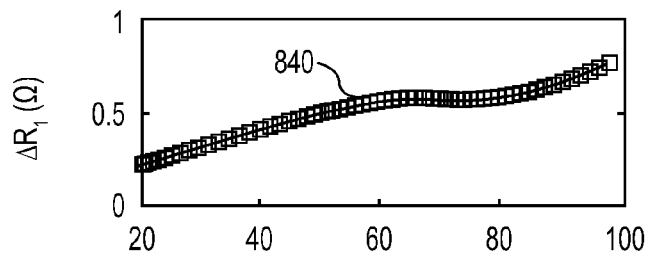
Figure 18C:
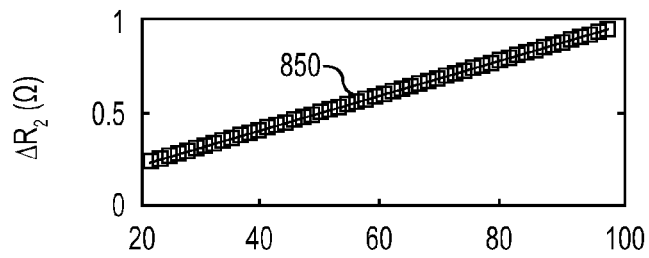
Figure 18D:
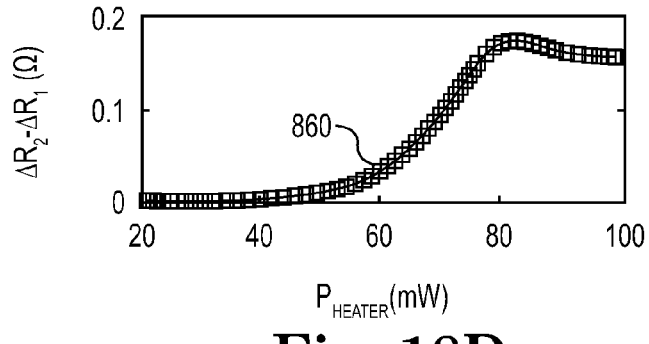

Experiments were conducted to demonstrate the efficacy of the differential resistance temperature sensor assembly 808. In one experiment, and with reference to FIGS. 18A-18D, the resistance of one resistance temperature sensor, $R_2$ (e.g., TCR sensor $R_2$ (106)) located away from the close point, $C_P$, varies linearly with heater element power. The linear resistance response of the sensor $R_2$ can be seen in FIG. 18C. The resistance of the other resistance temperature sensor, $R_1$ (e.g., TCR sensor $R_1$ (105) located at the close point, $C_P$, varies non-linearly with heater element power. The non-linear resistance response of the sensor $R_1$ can be seen in the plot of FIG. 18B. The differential signal generated using outputs from sensors $R_1$ and $R_2$ is shown in the plot of FIG. 18C, which clearly shows a head-media contact signature. It can be seen that if a head-media contact event is declared at 80 mW, then the friction force is relatively low (e.g. ~10 mgf), as can be seen in the plot of FIG. 18A.

In accordance with some embodiments, and with continued reference to FIG. 17A-17C, a differential resistance temperature sensor assembly 808 comprises one resistance temperature sensor and another component of the head transducer that includes TCR material, such as a writer coil, a reader or an inactive heater of the head transducer (e.g., a BCR head transducer). The resistance temperature sensor, such as TCR sensor $R_1$ (105), is located at the close point, $C_P$, and the writer coil, reader or unused heater (represented by sensor $R_2$ (106)) is situated at a typical location away from the close point, $C_P$.

Figure 19:
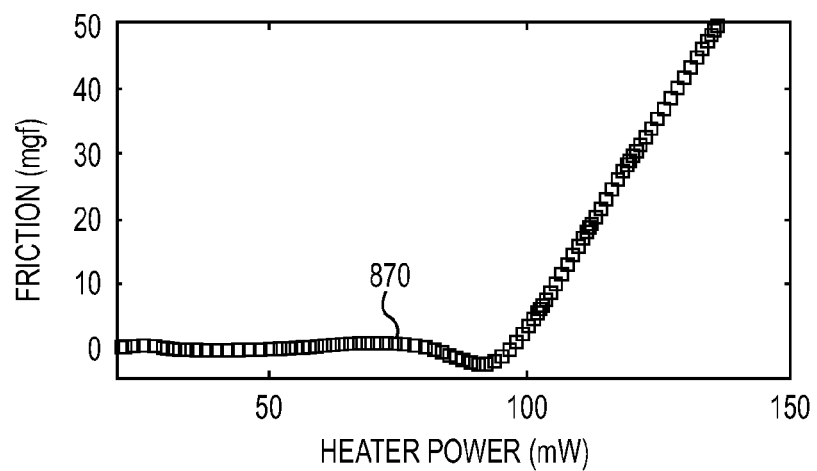
FIGS. 19 and 20 show plots of data from an experiment that demonstrate the efficacy of using a differential resistance temperature sensor assembly that comprises one resistance temperature sensor and a writer coil of the recording head transducer in accordance with various embodiments.
Figure 20:
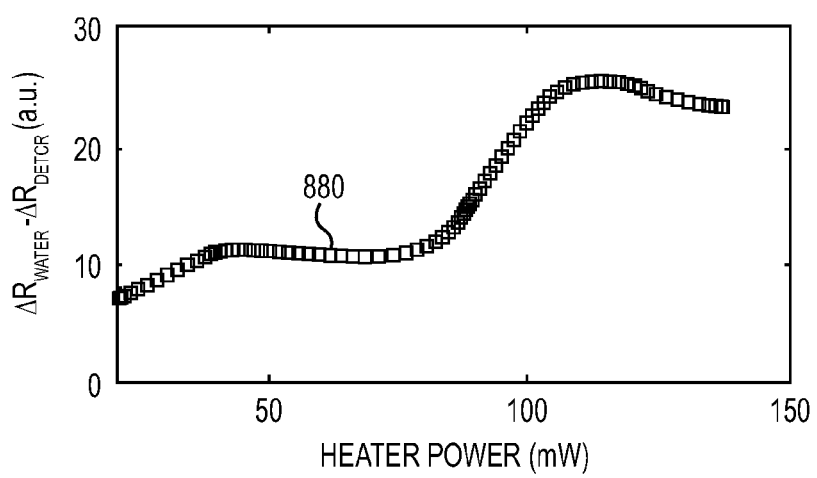

In an experiment that demonstrated the efficacy of this differential resistance temperature sensor configuration, the heater element of the resistance temperature sensor was modulated at 180 Hz and a lock-in amplifier was used to read the difference of the voltage drop across the resistance temperature sensor and the writer coil. The resistance temperature sensor was biased at 164 μA and the writer coil was biased at 1 μA to make sure the differential response was flat before head-media contact (i.e., flat for heater element power between 50 mW and 80 mW in this example). FIGS. 19 and 20 show plots of data from the experiment that demonstrate the efficacy of using a differential resistance temperature sensor assembly that comprises one resistance temperature sensor and a writer coil of the recording head transducer. The curve 880 in FIG. 20 is the difference in voltage drop change between the resistance temperature sensor and the writer coil as a function of heater element power. The curve 870 in FIG. 19 is the friction force curve measured simultaneously. Embodiments of a differential resistance temperature sensor arrangement that comprises a resistance temperature sensor and a writer coil of the recording head transducer advantageously provides for improved head-media contact detection SNR without need for adding any extra structure or pads.

FIG. 17C is a cross-sectional illustration of a trailing section of a slider 800 that supports a recording head transducer and resistance temperature sensor assembly in accordance with various embodiments. In FIG. 17C, the slider 800 includes an airbearing surface 801 that faces a surface of an adjacent magnetic recording medium (not shown). The slider 800 supports a recording head transducer 805 which includes a reader 810 and a writer 820. A heater 812 for the reader 810 can be actuated to cause the reader 810 to protrude toward the surface of the recording medium, thereby reducing the separation therebetween during read operations. The writer 820 includes a write pole 824 which is inductively coupled to one or more sets of coils 821. A heater 822 for the writer 820 can be actuated to cause the writer 820 to protrude toward the surface of the recording medium, thereby reducing the separation therebetween during write operations.

In the illustration of FIG. 17C, three resistive components are shown. Resistive components 105 and 106 are located on the ABS 801 and resistive component 809 is located away from the ABS 801. Although these three resistive components are shown in FIG. 17C, not all three are required, but are included for explanation of various embodiments. According to some embodiments, resistive components 105 and 106 are TCR sensors, and reference resistor 809 would not be present. In this scenario, when the heater 812 of the reader 810 is being used, TCR sensor 105 is closer to the close point than TCR sensor 106. As a result, TCR sensor 105 is active and TCR sensor 106 is more distant from the close point and functions as the reference. When the heater 822 of the writer 820 is being used, TCR sensor 106 is closer to the close point than TCR sensor 105, and is active during use of the writer heater 822. In this case, TCR sensor 105 is more distant from the close point and functions as the reference.

According to embodiment involving use of reference resistor 809 positioned away from the ABS, only one ABS TCR sensor would be present. In the configuration shown in FIG. 17C, TCR sensor 105 would preferably be present (and TCR sensor 106 would not be present) since TCR sensor 105 is coplanar with reference resistor 809 in the schematic illustration and could be formed in the same deposition and etch step, meaning that TCR sensor 105 is the more practical of the two TCR sensors 105 and 106.

Various embodiments described herein involve contact detection based on a cooling event, where the medium is cooler than the head transducer. This is generally applicable for higher TCR sensor bias values and conducting media substrates, making the TCR sensor hotter than the medium. According to other embodiments, the head transducer surface temperature at the interface can be lowered to be substantially lower than the media temperature by lowering the bias power to the TCR sensor and, if desired, using a non-thermal actuator in the head transducer. This approach provides for improved frictional heating detection, which can be used to declare head-media contact. Such an approach is particularly useful for poorly conducting media substrates, such as glass.

Conventional approaches for detecting head-media contact often involve measuring an AC signal from a resistance temperature sensor that is believed to be caused by head modulation. The DC signal is filtered out because it is not believed to have a signal-to-noise ratio sufficient to detect a head-media contact event. For most, if not all, current advanced air bearing (AAB) implementations, this conventional approach has proved to be effective in detecting head-media contact.

However, great effort is currently being expended on developing an interface for contact or beyond contact recording (BCR) to satisfy ever decreasing head-media spacing targets for achieving higher area densities. A key feature of these interfaces is very minimal modulation at head-media contact. Such a head-disk interface poses a great challenge to current contact detection methodologies, including those that employ a resistance temperature sensor. Because resistance temperature sensors are currently used on heads for thermal asperity detection, it would be highly desirable for next generation drives to adapt existing heads equipped with resistance temperature sensors for use in low modulation interfaces.

Various embodiments of the disclosure are directed to non-modulation based head-media contact detection apparatuses and methods. Head-media contact detection according to various embodiments is evaluated based on changes in a relationship of resistance and power associated with a resistance temperature sensor, rather than detecting air bearing-based or head-based modulation.

A resistance temperature sensor has been found to be a particularly useful head-media contact detection sensor for reasons discussed previously. A resistance temperature sensor is, in essence, a thermal sensitive resistor on a pole tip. A resistance temperature sensor measures the temperature change induced by all thermal condition changes from air pressure, clearance, and contact, among other changes.

Figure 21:
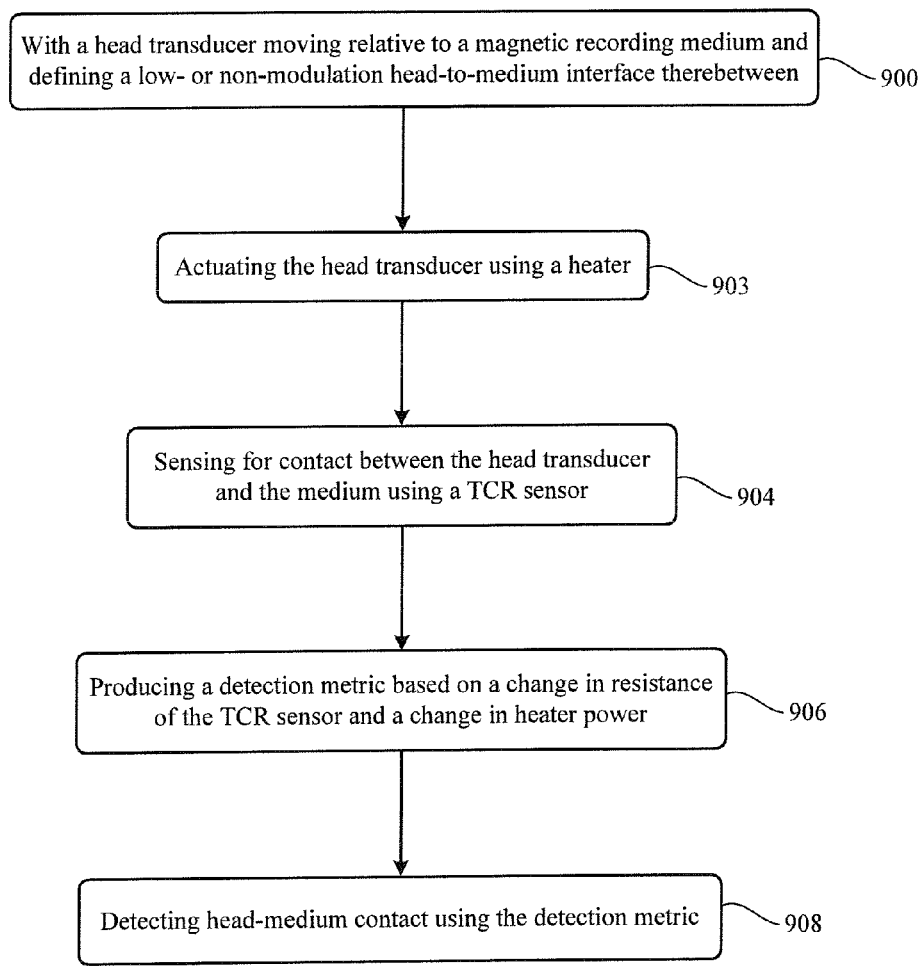
FIG. 21 is a flow chart showing various processes of a method for detecting head-medium contact for a low- or non-modulation head-to-medium interface in accordance with various embodiments.

FIG. 21 is a flow chart showing various processes of a method for detecting head-medium contact for a low- or non-modulation head-to-medium interface in accordance with various embodiments. With a head transducer moving relative to a magnetic recording medium and defining a low- or non-modulation head-to-medium interface therebetween 900, method embodiments involve actuating 903 the head transducer using a heater, and sensing 904 for contact between the head transducer and the medium using a TCR sensor. The method also involves producing 906 a detection metric based on a change in resistance of the TCR sensor and a change in heater power, and detecting 908 head-medium contact using the detection metric.

According to various representative embodiments, the ratio of a change in resistance ($\Delta R$) to a change in power ($\Delta P$), denoted $\Delta R/\Delta P$, provides a non-modulation based metric for evaluating head-media spacing and performing head-media contact detection. The metric $\Delta R/\Delta P$ decreases linearly with decreasing head-to media clearance. Detecting a deviation from linearity in $\Delta R/\Delta P$ and a minima indicates head-media contact and head-media caused cooling and frictional heating. Such an approach does not rely on AAB modulation for contact detection. Experimentation has demonstrated that head-media spacing and contact detection in accordance with embodiments of the disclosure is very effective for implementations that use advanced air bearings and beyond contact recording AABs.

For an airbearing, head transducer cooling efficiency improves with reduced clearance due to an increase in thermal transport efficiency. Head transducer cooling efficiency reaches a maximum when the head transducer contacts the media because the media provides an efficient thermal sink to the head transducer. According to embodiments of the disclosure, head-media contact can be detected by monitoring the interface cooling efficiency that is not caused by head modulation.

Figure 22A:
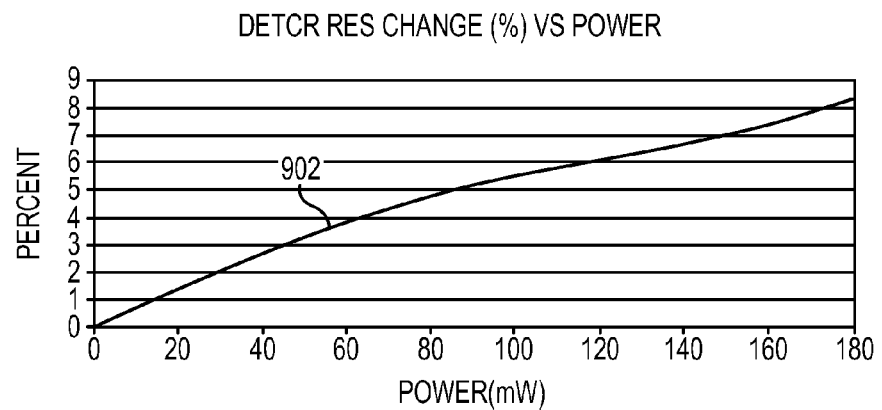
FIG. 22A is a plot of resistance temperature sensor resistance versus heater element power for a resistance temperature sensor configured to provide a non-modulation based metric for evaluating head-media spacing and performing head-media contact detection in accordance with various embodiments.

The DC signal from a resistance temperature sensor is dominated by heater element-based heating. The resistance change caused by interface cooling/heating represents only a fraction of that caused by the heater element of the resistance temperature sensor. It is generally difficult to know with certainty where head-media contact occurs based on a resistance measurement, as can be seen in the plot shown in FIG. 22A. FIG. 22A is a plot 902 of resistance temperature sensor resistance versus heater element power.

One measure of the head-to-disk interface (HDI) cooling condition is the rate of the temperature rise over heater power, or $\Delta R/\Delta P$. $\Delta R/\Delta P$ decreases with a better cooling condition. $\Delta R/\Delta P$ reaches a minimum at head-media contact. $\Delta R/\Delta P$ will increase again after head-media contact due to frictional heating. The head-media contact can be detected by monitoring the metric $\Delta R/\Delta P$ instead of the head modulation.

An experiment was conducted to verify the efficacy of using $\Delta R/\Delta P$ for head-media contact detection. The experiment involved use of a BCR AAB head which incorporated a resistance temperature sensor. The resistance temperature sensor was biased with a fixed current from a source meter. The sensor resistance was measured by the same meter. The heater element power was applied with a voltage sourced from a second source meter. The power was measured with the same meter at the same time. Arm electronics RMS was taken at the same time as the resistance temperature sensor measurements.

Figure 22B:
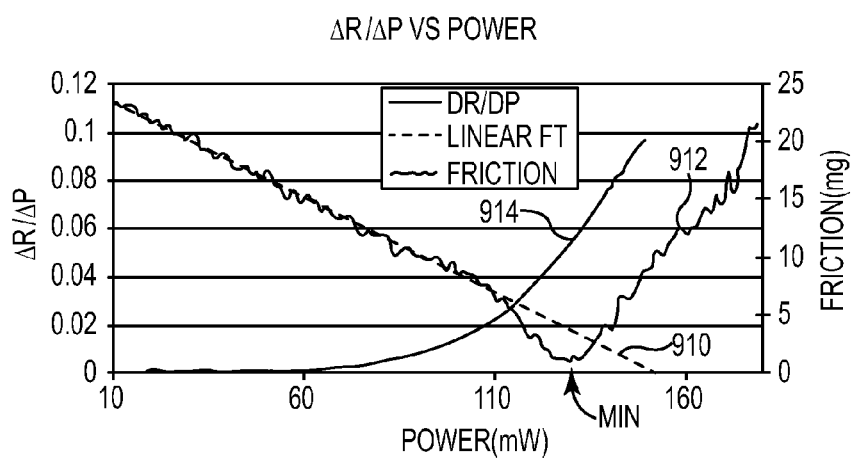
FIG. 22B is a plot of a non-modulation based metric for evaluating head-media spacing and performing head-media contact detection in accordance with various embodiments.

A plot of the metric $\Delta R/\Delta P$ for the experiment is shown in FIG. 22B. It can be seen in FIG. 22B that the value of $\Delta R/\Delta P$ (plot 912) is linearly trending down until it reaches a minimum, denoted as Min in FIG. 22B, then starts increasing thereafter. $\Delta R/\Delta P$ deviates (drops) from the linear trend 910 first before it reaches the minimum, Min. This signature indicates the cooling caused by initiation of the head-media contact. The minimum point, Min, indicates full head-media contact and that heat is generated by friction.

It can be appreciated that performing accurate direct resistance measurements with DC current can be challenging for the drive electronics. For example, sensor resistance changes caused by the interface heating and cooling condition change is typically less than about 10% of its mean resistance. Considering the resolution of the analog-to-digital converter (ADC) in a typical drive is 8 bits, it would be difficult to measure the resistance directly to less than 0.01 Ohm accuracy.

Figure 23:
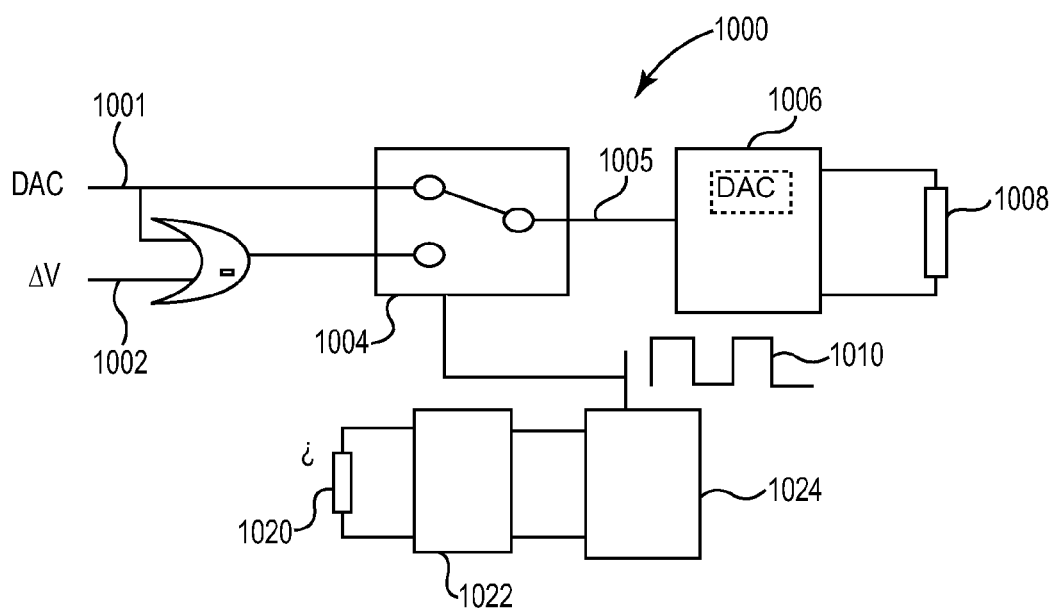
FIG. 23 is a circuit diagram of one approach for measuring a detection metric based on a rate of change in resistance of a TCR sensor and a rate of change in heater power in situ a hard disk drive in accordance with various embodiments.

With reference to FIG. 23, one approach according to various embodiments involves measuring the $\Delta R/\Delta P$ directly in hard disk drive. Such an approach uses an analog switch as a modulator to modulate the heater element power and uses phase sensitive detection (PSD) to lock in the frequency to detect the resistance change from the resistance temperature sensor.

A direct measurement of the $\Delta R/\Delta P$ can be achieved by a scheme implemented by the representative circuit 1000 shown in FIG. 23. In the embodiment shown in FIG. 23, an analog switch 1004 is coupled to a power circuit 1006 of a heater element 1008. The heater element power in a hard disk drive is proportional to the DAC counts, shown as an input 1001 to the analog switch 1004. If the input 1005 of the heater element power circuit 1006 is switched (e.g., modulated) at a fixed frequency between the direct DAC output on input 1001 and an offset, $\Delta V$, from the DAC output 1001 on a second input 1002, the heater element power will be modulating between P and P-DP. A phase sensitive detection circuit 1024, coupled to a resistance temperature sensor 1020 via a preamplifier 1022, can be used to measure the resistance temperature sensor response at the modulation frequency, which would be the $\Delta R$ caused by this $\Delta P$. The noise on $\Delta R/\Delta P$ is significantly reduced by pulsing the heater element 1008 and using a PSD device 1024 to measure the resistance temperature sensor response.

Therefore, head-media contact can be detected by monitoring the AR response of the resistance temperature sensor 1020, which is preferably a TCR sensor situated at or near the close point. The modulation frequency can be as high as over 10 kHz and the measurement on $\Delta R$ can be done very fast and with great accuracy, because it is not limited by the heater element time constant.

Other embodiments are directed to driving the heater element 1008 with alternating current. For example, the heater element 1008 can be driven with alternating current at a desired frequency (e.g., ~50 kHz to ~80 kHz) by appropriately configuring the DAC of the heater element power circuit 1006, such as by programming software of the DAC. The detection circuit 1024 can be configured to measure the resistance temperature sensor response at the frequency of the alternating current that drives the heater element 1008. Software control of the heater oscillation provides for increased flexibility to specify the waveform applied to the heater element 1008. This allows use of a variety of waveforms to drive the heater element 1008, including square, sine, triangle, or other waveforms that can enhance the contact detection signal.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
    a head transducer configured to interact with a magnetic recording medium, the head transducer comprising an air bearing surface having a plurality of thermally actuatable close points;
    a first sensor disposed at or proximate a first close point of the plurality of close points and having a temperature coefficient of resistance (TCR);
    a second sensor disposed at or proximate a second close point of the plurality of close points and having a TCR;
    the first and second sensors connected in a series relationship; and
    circuitry coupled to the first and second sensors, the circuitry configured produce a sensor signal indicative of one or both of a change in head-medium spacing and head-medium contact relative to the first and second close points, respectively.

2. The apparatus of claim 1, wherein the circuitry is configured to detect one or both of a change in head-medium spacing and head-medium contact relative to the first close point using a signal produced by at least the first sensor.

3. The apparatus of claim 1, wherein the circuitry is configured to detect one or both of a change in head-medium spacing and head-medium contact relative to the second close point using a signal produced by at least the second sensor.

4. The apparatus of claim 1, wherein the head transducer comprises:
    a first heater configured to thermally actuate the first close point; and
    a second heater configured to thermally actuate the second close point.

5. The apparatus of claim 1, wherein:
    a first component is disposed at or near the first close point; and
    a second component is disposed at or near the second close point.

6. The apparatus of claim 1, wherein:
    a writer is disposed at or near the first close point; and
    a reader is disposed at or near the second close point.

7. The apparatus of claim 1, wherein at least one of the first and second sensors comprises one of a writer coil, a reader, and a heater.

8. The apparatus of claim 1, wherein:
    each of the first and second sensors is coupled to a fixed number of electrical connection pads; and
    the circuitry is configured to produce the sensor signal indicative of one or both of the change in head-medium spacing and head-medium contact without addition of an extra electrical connection pad.

9. The apparatus of claim 1, wherein the first and second sensors are similar in terms of resistance.

10. The apparatus of claim 1, wherein the first and second sensors are similar in terms of temperature coefficient of resistance.

11. The apparatus of claim 1, wherein the first and second sensors differ in terms of temperature coefficient of resistance.

12. The apparatus of claim 1, wherein the first sensor has a resistance change versus temperature that differs from that of the second sensor.

13. The apparatus of claim 1, wherein:
    a first parameter combination associated with the first sensor is defined by $R_{1,0}\alpha_1\Delta T_1$;
    a second parameter combination associated with the second sensor is defined by $R_{2,0}\alpha_2\Delta T_2$; and
    values for the parameters of the first and second parameter combinations are selected such that a sum of the first and second parameter combinations is substantially constant for first and second sensor operation prior to head-medium contact;
    where $\Delta T_1$ and $\Delta T_2$ are temperature changes of the first and second sensors, respectively, $\alpha_1$ and $\alpha_2$ are temperature coefficients of resistance of the first and second sensors, respectively, and $R_{1,0}$ and $R_{2,0}$ are resistances at ambient temperature of the first and second sensors, respectively.

14. The apparatus of claim 1, wherein a low- or non-modulation interface is defined between the head transducer and the medium.

15. An apparatus, comprising:
    a head transducer configured to interact with a magnetic recording medium, the head transducer comprising an air bearing surface having a plurality of thermally actuatable close points;
    a writer and a first resistance temperature sensor respectively disposed at or proximate a first close point of the plurality of close points;
    a reader and a second resistance temperature sensor respectively disposed at or proximate a second close point of the plurality of close points;
    the first and second sensors connected in a series relationship; and
    circuitry coupled to the first and second sensors and configured produce a sensor signal indicative of one or both of a change in head-medium spacing and head-medium contact relative to the first and second close points, respectively.

16. The apparatus of claim 15, wherein:
    each of the first and second sensors is coupled to a fixed number of electrical connection pads; and
    the circuitry is configured to produce the sensor signal indicative of one or both of the change in head-medium spacing and head-medium contact without addition of an extra electrical connection pad.

17. The apparatus of claim 15, wherein the first and second sensors are similar in terms of resistance.

18. The apparatus of claim 15, wherein the first and second sensors are similar in terms of temperature coefficient of resistance.

19. The apparatus of claim 15, wherein the first and second sensors differ in terms of temperature coefficient of resistance.

20. The apparatus of claim 15, wherein the first sensor has a resistance change versus temperature that differs from that of the second sensor.

\* \* \* \* \*